(12) United States Patent
Kubouchi et al.

(10) Patent No.: US 9,893,606 B1
(45) Date of Patent: Feb. 13, 2018

(54) THREE-LEVEL CHOPPER APPARATUS

(71) Applicant: FUJI ELECTRIC CO., LTD., Kawasaki-shi, Kanagawa (JP)

(72) Inventors: Motoyoshi Kubouchi, Matsumoto (JP); Yasushi Abe, Hino (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 15/622,778

(22) Filed: Jun. 14, 2017

(30) Foreign Application Priority Data

Jul. 29, 2016 (JP) ................................. 2016-150227

(51) Int. Cl.
| | |
|---|---|
| G05F 1/569 | (2006.01) |
| G05F 1/571 | (2006.01) |
| H01F 6/00 | (2006.01) |
| H02H 7/122 | (2006.01) |
| H02M 1/32 | (2007.01) |
| H02M 3/158 | (2006.01) |
| H02M 1/14 | (2006.01) |
| H02M 7/537 | (2006.01) |
| H02P 27/06 | (2006.01) |

(52) U.S. Cl.
CPC ............... H02M 1/32 (2013.01); H02M 1/14 (2013.01); H02M 3/158 (2013.01); H02M 7/537 (2013.01); H02M 2001/325 (2013.01); H02P 27/06 (2013.01)

(58) Field of Classification Search
CPC .......... G05F 1/569; G05F 1/571; H02M 1/32
USPC .... 323/276, 285; 363/34, 50, 55, 56.11, 124
See application file for complete search history.

(56) References Cited

U.S. PATENT DOCUMENTS

| | | | | |
|---|---|---|---|---|
| 4,511,823 A | * | 4/1985 | Eaton .................. | H02M 7/5236 315/208 |
| 5,251,119 A | * | 10/1993 | Maehara ............. | H02M 1/4241 315/226 |
| 5,517,403 A | * | 5/1996 | Maehara ............... | H02M 1/425 363/132 |
| 5,568,368 A | * | 10/1996 | Steigerwald ............. | H02J 3/38 363/132 |
| 2010/0177452 A1 | * | 7/2010 | Wei ........................ | H02P 27/06 361/111 |

FOREIGN PATENT DOCUMENTS

JP        H09-135589 A      5/1997

* cited by examiner

*Primary Examiner* — Gary Nash
(74) *Attorney, Agent, or Firm* — Manabu Kanesaka

(57) ABSTRACT

A three-level chopper apparatus includes a protection switch circuit that changes a current pathway through which an overvoltage is applied to a second capacitor or a first capacitor to a current pathway through which no overvoltage is applied to the second capacitor or the first capacitor when a first switch or a second switch has a failure.

24 Claims, 10 Drawing Sheets

THREE-LEVEL CHOPPER APPARATUS

CROSS-REFERENCE TO RELATED APPLICATION

The priority application number JP2016-150227, Three-Level Chopper Apparatus, Jul. 29, 2016, Motoyoshi Kubouchi and Yasushi Abe, upon which this patent application is based, is hereby incorporated by reference.

BACKGROUND OF THE INVENTION

Field of the Invention

The present invention relates to a three-level chopper apparatus, and more particularly, it relates to a three-level chopper apparatus including a first capacitor and a second capacitor connected in series to each other.

Description of the Background Art

A three-level chopper apparatus including a first capacitor and a second capacitor connected in series to each other is known in general, as disclosed in Japanese Patent Laying-Open No. 9-135589.

Japanese Patent Laying-Open No. 9-135589 discloses a speed controller for an induction motor that includes a direct-current power supply, a reactor, first and second switches including transistors or the like, first and second capacitors connected in series to each other, and first and second diodes. In this speed controller, the reactor and the first and second switches are connected in series to the direct-current power supply. A series circuit including the first diode and the first capacitor is connected to both ends of the first switch, and a series circuit including the second capacitor and the second diode is connected to both ends of the second switch. This speed controller further includes a connection path that connects a connection point between the first switch and the second switch and a connection point between the first capacitor and the second capacitor.

The conventional speed controller described in Japanese Patent Laying-Open No. 9-135589 is provided with a failure detector that detects the potential (hereinafter referred to as an intermediate potential) of a point at which the first capacitor and the second capacitor are connected in series to each other and detects the failures of the first capacitor and the second capacitor based on the detected intermediate potential. Furthermore, when the conventional speed controller has a failure, the first switch and the second switch of the speed controller are generally turned off or a semiconductor switch element of an inverter provided between the speed controller and a load is generally turned off such that a current to the load (induction motor) is interrupted. Consequently, the speed controller is protected. When one (first switch, for example) of the first switch and the second switch connected in series to each other has a short circuit failure in the convention speed controller, for example, the semiconductor switch element of the inverter is turned off such that the load is separated from the speed controller, and control for turning off the other (second switch, for example) of the first switch and the second switch of the speed controller is performed.

When one of the first switch and the second switch has a short circuit failure in the convention speed controller (chopper apparatus), the semiconductor switch element of the inverter is turned off such that the load is separated from the speed controller. When the other of the first switch and the second switch of the speed controller is turned off, a series resonant current flows to the reactor connected to the direct-current power supply and the capacitor corresponding to the other of the first and second switches through one of the first and second switches, which has a short circuit failure, and the connection path in this speed controller. Thus, the capacitor corresponding to the other of the first and second switches is disadvantageously charged to a voltage higher than the voltage of the direct-current power supply so that an overvoltage occurs on the capacitor.

SUMMARY OF THE INVENTION

The present invention has been proposed in order to solve the aforementioned problem, and an object of the present invention is to provide a three-level chopper apparatus capable of inhibiting the charging voltage of a capacitor from becoming an overvoltage even when a failure is generated in a switch.

In order to attain the aforementioned object, a three-level chopper apparatus according to an aspect of the present invention includes a direct-current power supply, a first switch and a second switch, a first diode and a second diode, a first capacitor and a second capacitor, a reactor, a connection path, and a protection switch circuit. The first diode, the first capacitor, the second capacitor, the second diode, the second switch, and the first switch are connected in series to each other in this order in a loop, the direct-current power supply is connected in parallel between a connection point between the first diode and the first switch and a connection point between the second switch and the second diode through the reactor, the connection path connects a connection point between the first switch and the second switch and a connection point between the first capacitor and the second capacitor, and the protection switch circuit is controllable to change a current pathway through which an overvoltage is applied to the second capacitor or the first capacitor to a current pathway through which no overvoltage is applied to the second capacitor or the first capacitor when the first switch or the second switch has a failure.

In the three-level chopper apparatus according to this aspect of the present invention, as hereinabove described, the protection switch circuit is controllable to change the current pathway through which an overvoltage is applied to the second capacitor or the first capacitor to the current pathway through which no overvoltage is applied to the second capacitor or the first capacitor when the first switch or the second switch has a failure. Thus, even when either the first switch or the second switch has a failure, the current pathway through which an overvoltage is applied to the second capacitor or the first capacitor is changed to the current pathway through which no overvoltage is applied to the second capacitor or the first capacitor by the protection switch circuit, and hence the charging voltage of the first capacitor or the second capacitor can be inhibited from becoming an overvoltage.

In the aforementioned three-level chopper apparatus according to this aspect, the protection switch circuit is preferably a bidirectional protection switch connected in series to the connection path. When the first switch or the second switch has a failure, the connection path becomes a part of the current pathway through which an overvoltage is applied to the second capacitor or the first capacitor. In view of this point, according to the present invention, the protection switch circuit is configured as the bidirectional protection switch connected in series to the connection path, whereby the connection path that is a part of the current pathway through which an overvoltage is applied to the first capacitor or the second capacitor can be easily changed to the connection path that is a part of the current pathway through which no overvoltage is applied to the first capacitor or the second capacitor by the bidirectional protection switch.

In this case, a diode of the bidirectional protection switch preferably includes a silicon diode. According to this structure, the on-voltage is reduced as compared with the case where the diode of the bidirectional protection switch includes a silicon carbide diode, for example, and hence an increase in a power loss can be suppressed.

In the aforementioned three-level chopper apparatus including the bidirectional protection switch, a diode of the bidirectional protection switch preferably includes a silicon carbide diode. According to this structure, the forward recovery voltage can be reduced as compared with the case where the diode of the bidirectional protection switch includes a silicon diode. Consequently, the forward recovery voltage is reduced, whereby the voltage ripple (flow ripple) is reduced such that the noise can be reduced.

In the aforementioned three-level chopper apparatus including the bidirectional protection switch, a diode of the bidirectional protection switch preferably includes a diode in which a silicon diode and a silicon carbide diode are connected in parallel to each other. According to this structure, the on-voltage can be reduced while the forward recovery voltage can be reduced, and hence the noise can be reduced while an increase in a power loss is suppressed.

In the aforementioned three-level chopper apparatus including the bidirectional protection switch, the protection switch circuit preferably includes a first resistance connected in parallel to the bidirectional protection switch. According to this structure, when the first switch has a short circuit failure and control for turning off the bidirectional protection switch is performed, for example, an LC series resonant current flows through a pathway from the direct-current power supply through the reactor, the first switch having a short circuit failure, the first resistance, the second capacitor, and the second diode to the direct-current power supply. In this case, the first resistance is included in this pathway, and hence this pathway forms an LCR series resonant circuit. A resonant current that flows through this LCR series resonant circuit undergoes damped oscillation. Consequently, the amount of charges that flows into the second capacitor is reduced, and hence occurrence of an overvoltage on the second capacitor can be suppressed. In this description, the term "turn on a switch" denotes a state where a current is conducted by the switch, and the term "turn off a switch" denotes a state where a conduction path is disconnected (the flow of a current is blocked) by the switch.

In the aforementioned three-level chopper apparatus including the bidirectional protection switch, the protection switch circuit preferably includes a first protection capacitor connected in parallel to the bidirectional protection switch. According to this structure, when the first switch has a shirt circuit failure and control for turning off the bidirectional protection switch is performed, for example, an LC series resonant current flows through a pathway from the direct-current power supply through the reactor, the first switch having a short circuit failure, the first protection capacitor, the second capacitor, and the second diode to the direct-current power supply. In this case, the first protection capacitor and the second capacitor are charged through this pathway while sharing charges, and hence occurrence of an overvoltage on the second capacitor can be suppressed as compared with the case where only the second capacitor is charged.

In the aforementioned three-level chopper apparatus according to this aspect, the protection switch circuit preferably includes a first protection switch connected in series between the first switch and the connection path, a second protection switch connected in series between the second switch and the connection path, and a second resistance connected in parallel between a connection point between the first switch and the first protection switch and a connection point between the second protection switch and the second switch. According to this structure, when the first switch has a short circuit failure and control for turning off the first protection switch and turning on the second protection switch is performed, for example, an LC series resonant current flows through a pathway from the direct-current power supply through the reactor, the first switch having a short circuit failure, the second resistance, the second protection switch, the second capacitor, and the second diode to the direct-current power supply. In this case, the second resistance is included in this pathway, and hence this pathway forms an LCR series resonant circuit. A resonant current that flows through this LCR series resonant circuit undergoes damped oscillation. Consequently, the amount of charges that flows into the second capacitor is reduced, and hence occurrence of an overvoltage on the second capacitor can be further suppressed.

In the aforementioned three-level chopper apparatus according to this aspect, the protection switch circuit preferably includes a third protection switch connected in series between the first switch and the connection path, a fourth protection switch connected in series between the second switch and the connection path, and a second protection capacitor connected in parallel between a connection point between the first switch and the third protection switch and a connection point between the fourth protection switch and the second switch. According to this structure, when the first switch has a short circuit failure and control for turning off the third protection switch and turning on the fourth protection switch is performed, for example, an LC series resonant current flows through a pathway from the direct-current power supply through the reactor, the first switch having a short circuit failure, the second protection capacitor, the fourth protection switch, the second capacitor, and the second diode to the direct-current power supply. In this case, the second protection capacitor and the second capacitor are charged through this pathway while sharing charges, and hence occurrence of an overvoltage on the second capacitor can be more reliably suppressed as compared with the case where only the second capacitor is charged.

In the aforementioned three-level chopper apparatus according to this aspect, the protection switch circuit preferably includes a fifth protection switch connected in series between the first capacitor and the connection path, a sixth protection switch connected in series between the second capacitor and the connection path, and a third resistance connected in parallel between a connection point between the first capacitor and the fifth protection switch and a connection point between the sixth protection switch and the second capacitor. According to this structure, when the first switch has a short circuit failure and control for turning off the second switch, turning on the fifth protection switch, and turning off the sixth protection switch is performed, for example, an LCR series resonant circuit is formed in a pathway from the direct-current power supply, the reactor, the first switch having a short circuit failure, the fifth protection switch, the third resistance, the second capacitor, and the second diode to the direct-current power supply. Consequently, the amount of charges that flows into the second capacitor is reduced such that occurrence of an overvoltage on the second capacitor can be more effectively suppressed.

In this case, a resistance value Ra preferably satisfies a following formula (1): $Ra \geq 2 \times (2 \times L/C)^{1/2}$ where Ra represents a resistance value of the third resistance, L represents an inductance of the reactor, and C represents the smaller of a capacity of the first capacitor and a capacity of the second capacitor. According to this structure, a current that flows through the LCR series resonant circuit including the third resistance having the resistance value Ra can be critically damped or overdamped, and hence occurrence of an overvoltage on the first capacitor or the second capacitor can be more reliably suppressed when the first switch or the second switch has a short circuit failure.

In the aforementioned three-level chopper apparatus according to this aspect, the protection switch circuit preferably includes a seventh protection switch connected in series between the first capacitor and the connection path, an eighth protection switch connected in series between the second capacitor and the connection path, and a third protection capacitor connected in parallel between a connection point between the first capacitor and the seventh protection switch and a connection point between the eighth protection switch and the second capacitor. According to this structure, when the first switch has a short circuit failure and control for turning off the second switch, turning on the seventh protection switch, and turning off the eighth protection switch is performed, for example, an LC series resonant current flows through a pathway from the direct-current power supply through the reactor, the first switch having a short circuit failure, the seventh protection switch, the third protection capacitor, the second capacitor, and the second diode to the direct-current power supply. In this case, the third protection capacitor and the second capacitor are charged through this pathway while sharing charges, and hence occurrence of an overvoltage on the second capacitor can be suppressed as compared with the case where only the second capacitor is charged.

In the aforementioned three-level chopper apparatus according to this aspect, the protection switch circuit preferably includes a ninth protection switch connected in series to the reactor, and a fourth resistance connected in parallel to both ends of the ninth protection switch. According to this structure, when the first switch or the second switch has a short circuit failure, control for turning off the ninth protection switch is performed, whereby the fourth resistance can be added in the current pathway. Consequently, when the first switch or the second switch has a short circuit failure, the current pathway can be formed as an LCR series resonant circuit, and hence occurrence of an overvoltage on the first capacitor or the second capacitor can be suppressed.

In this case, a resistance value Rb preferably satisfies a following formula (2): $Rb \geq 2 \times (2 \times L/C)^{1/2}$ where Rb represents a resistance value of the fourth resistance, L represents an inductance of the reactor, and C represents the smaller of a capacity of the first capacitor and a capacity of the second capacitor. According to this structure, a current that flows through the LCR series resonant circuit including the fourth resistance having the resistance value Rb can be critically damped or overdamped, and hence occurrence of an overvoltage on the first capacitor or the second capacitor can be more reliably suppressed when the first switch or the second switch has a short circuit failure.

In the aforementioned three-level chopper apparatus according to this aspect, the protection switch circuit preferably includes a tenth protection switch connected in series to the reactor, and a fourth protection capacitor connected in parallel to both ends of the tenth protection switch. According to this structure, when the first switch or the second switch has a short circuit failure, control for turning off the tenth protection switch is performed, whereby the fourth protection capacitor can be added in the current pathway. In this case, the fourth protection capacitor and one of the first and second capacitors are charged through this pathway while sharing charges, and hence occurrence of an overvoltage on the first capacitor or the second capacitor can be suppressed as compared with the case where only the first capacitor or the second capacitor is charged.

In the aforementioned three-level chopper apparatus according to this aspect, the protection switch circuit preferably includes both a first protection switch partial circuit connected in series to the first switch, the second capacitor, the first diode, or the connection path, and a second protection switch partial circuit connected in series to the second switch, the first capacitor, the second diode, or the connection path. According to this structure, when the first switch or the second switch has a short circuit failure, the first protection switch partial circuit and the second protection switch partial circuit can effectively change the current pathway through which an overvoltage is applied to the first capacitor or the second capacitor to the current pathway through which no overvoltage is applied to the first capacitor or the second capacitor.

In this case, the first protection switch partial circuit preferably includes an eleventh protection switch, and is preferably connected in series to the first switch, the first diode, or the connection path. Thus, when the first switch or the second switch has a short circuit failure, the eleventh protection switch is turned off such that the current pathway through which an overvoltage is applied to the first capacitor or the second capacitor can be changed to the current pathway through which no overvoltage is applied to the first capacitor or the second capacitor.

In the aforementioned three-level chopper apparatus including the first protection switch partial circuit, the first protection switch partial circuit preferably includes a twelfth protection switch, and a fifth resistance connected in parallel to the twelfth protection switch. According to this structure, when the first switch or the second switch has a short circuit failure, control for turning off the twelfth protection switch is performed, whereby the fifth resistance can be added in the current pathway. Consequently, when the first switch or the second switch has a short circuit failure, the current pathway can be formed as an LCR series resonant circuit including the fifth resistance, and hence occurrence of an overvoltage on the first capacitor or the second capacitor can be suppressed.

In this case, the first protection switch partial circuit is preferably connected in series to the second capacitor, and a resistance value Rc preferably satisfies a following formula (3): $Rc \geq 2 \times (2 \times L/C2)^{1/2}$ where Rc represents a resistance value of the fifth resistance, L represents an inductance of the reactor, and C2 represents a capacity of the second capacitor. According to this structure, a current that flows through the LCR series resonant circuit including the fifth resistance having the resistance value Rc can be critically damped or overdamped, and hence occurrence of an overvoltage on the first capacitor or the second capacitor can be more reliably suppressed when the first switch or the second switch has a short circuit failure.

In the aforementioned three-level chopper apparatus including the first protection switch partial circuit, the first protection switch partial circuit preferably includes a thirteenth protection switch, and a fifth protection capacitor connected in parallel to the thirteenth protection switch. According to this structure, when the first switch or the second switch has a short circuit failure, the thirteenth protection switch is turned off, whereby the fifth protection capacitor and the first capacitor or the second capacitor are charged through the current pathway while sharing charges. Therefore, occurrence of an overvoltage on the first capacitor or the second capacitor can be suppressed as compared with the case where only the first capacitor or the second capacitor is charged.

In the aforementioned three-level chopper apparatus including the second protection switch partial circuit, the second protection switch partial circuit preferably includes a fourteenth protection switch, and is preferably connected in series to the second switch, the second diode, or the connection path. According to this structure, occurrence of an overvoltage on the first capacitor or the second capacitor can be suppressed similarly to the case where the first protection switch partial circuit includes the twelfth protection switch.

In the aforementioned three-level chopper apparatus including the second protection switch partial circuit, the second protection switch partial circuit preferably includes a fifteenth protection switch, and a sixth resistance connected in parallel to the fifteenth protection switch. According to this structure, occurrence of an overvoltage on the first capacitor or the second capacitor can be suppressed similarly to the case where the first protection switch partial circuit includes the twelfth protection switch and the fifth resistance.

In this case, the second protection switch partial circuit is preferably connected in series to the first capacitor, and a resistance value Rd preferably satisfies a following formula (4): $Rd \geq 2 \times (2 \times L/C1)^{1/2}$ where Rd represents a resistance value of the sixth resistance, L represents an inductance of the reactor, and C1 represents a capacity of the first capacitor. According to this structure, a current that flows through the LCR series resonant circuit including the sixth resistance having the resistance value Rd can be critically damped or overdamped, and hence occurrence of an overvoltage on the first capacitor or the second capacitor can be more reliably suppressed when the first switch or the second switch has a short circuit failure.

In the aforementioned three-level chopper apparatus including the second protection switch partial circuit, the second protection switch partial circuit preferably includes a sixteenth protection switch, and a sixth protection capacitor connected in parallel to the sixteenth protection switch. According to this structure, occurrence of an overvoltage on the first capacitor or the second capacitor can be suppressed similarly to the case where the first protection switch partial circuit includes the thirteenth protection switch and the fifth protection capacitor connected in parallel to the thirteenth protection switch.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

First Embodiment

The structure of a three-level chopper apparatus 100 according to a first embodiment is now described.

(Structure of Three-Level Chopper Apparatus According to First Embodiment)

Figure 1:
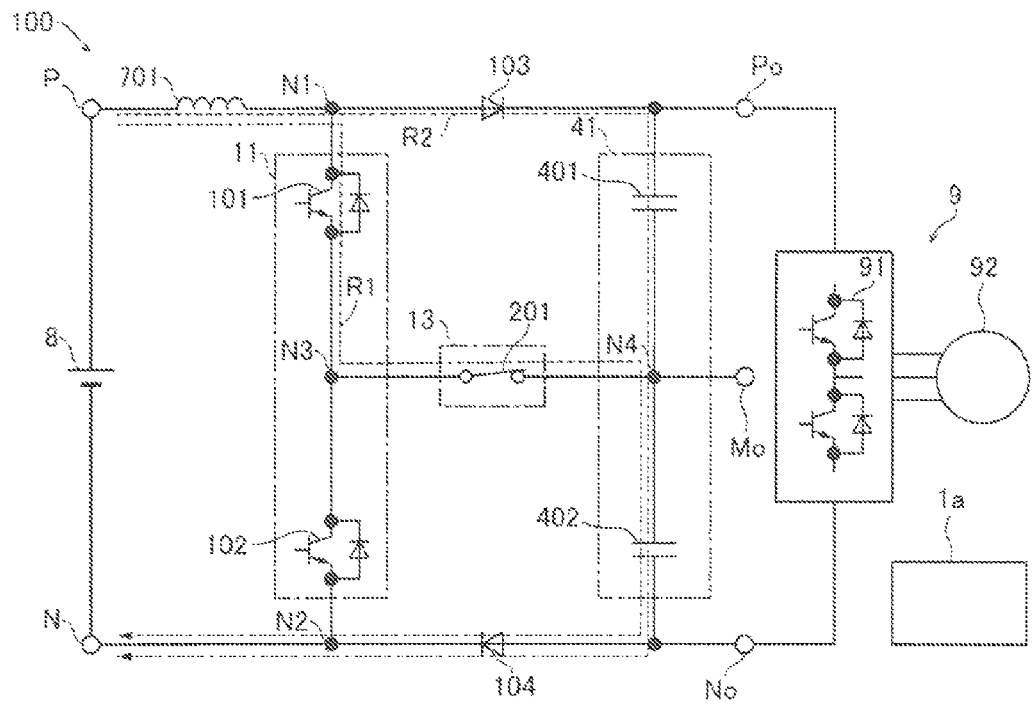
FIG. 1 is a circuit configuration diagram of a three-level chopper apparatus according to a first embodiment of the present invention.

This three-level chopper apparatus 100 according to the first embodiment converts the voltage VE of a direct-current power supply 8 into direct-current voltages of three levels and outputs the direct-current voltages from a high potential output terminal Po, an intermediate potential output terminal Mo, and a low potential output terminal No, as shown in FIG. 1. The three-level chopper apparatus 100 is configured as a power converter used in the industrial field, the railway field, the power generation field, etc.

According to the first embodiment, the three-level chopper apparatus 100 includes the direct-current power supply 8, switches 101 and 102, diodes 103 and 104, capacitors 401 and 402, a chopper reactor 701 (hereinafter referred to as a "reactor 701"), a connection path 13, a protection switch 201, and a control circuit 1a, as shown in FIG. 1. The switches 101 and 102 are examples of a "first switch" and a "second switch" in the claims, respectively. The capacitors 401 and 402 are examples of a "first capacitor" and a "second capacitor" in the claims, respectively. The diodes 103 and 104 are examples of a "first diode" and a "second diode" in the claims, respectively. The protection switch 201 is an example of a "protection switch circuit" in the claims.

The diode 103, the capacitor 401, the capacitor 402, the diode 104, the switch 102, and the switch 101 are connected in series to each other in this order in a loop. The direct-current power supply 8 is connected in parallel between a connection point N1 between the diode 103 and the switch 101 and a connection point N2 between the switch 102 and the diode 104 through the reactor 701.

The connection path 13 connects a connection point N3 between the switch 101 and the switch 102 and a connection point N4 between the capacitor 401 and the capacitor 402. According to the first embodiment, the protection switch 201 is controllable to change a current pathway R1 through which an overvoltage is applied to the capacitor 402 or the capacitor 401 to a current pathway R2 through which no overvoltage is applied to the capacitor 402 or the capacitor 401 when the switch 101 or the switch 102 has a failure. The structure is now described in concrete terms.

In the three-level chopper apparatus 100, a switch series circuit 11 is connected between a positive pole P and a negative pole N of the direct-current power supply 8 through the reactor 701 connected in series. The switch series circuit 11 is formed by connecting the switches 101 and 102 including semiconductor switch elements such as transistors in series to each other.

Figure 2:
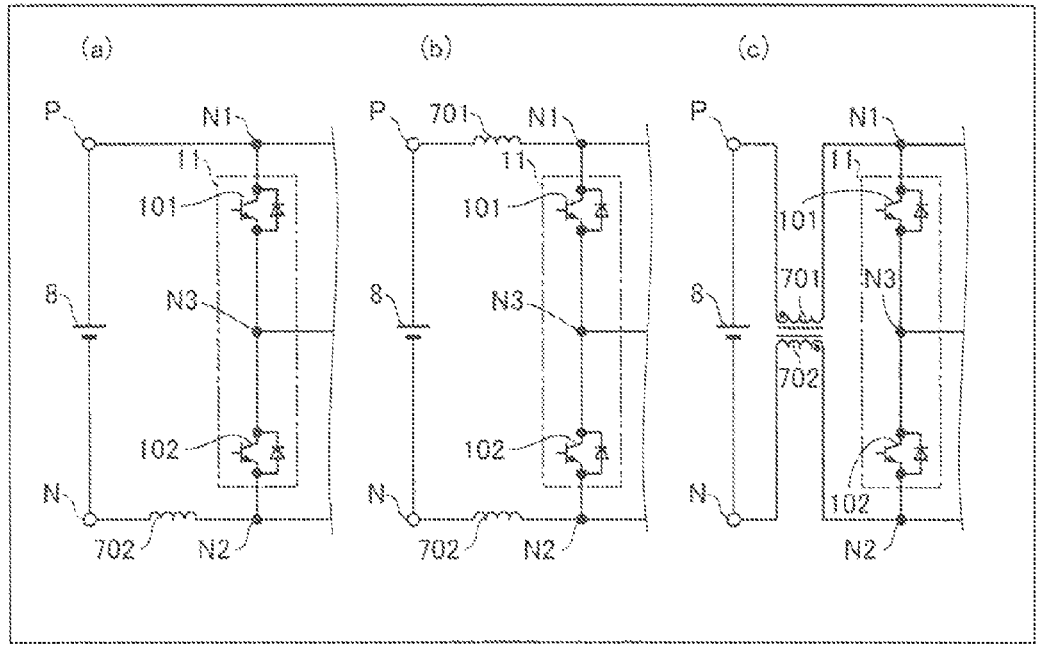
FIG. 2 is a circuit configuration diagram of a three-level chopper apparatus according to a modification of the first embodiment of the present invention.

Although the reactor 701 is connected to only the positive pole P of the direct-current power supply in FIG. 1, a reactor 702 may be connected to only the negative pole N in the three-level chopper apparatus 100, as shown in view (a) of FIG. 2. Alternatively, the reactors 701 and 702 may be connected to both the positive pole P and the negative pole N, respectively, in the three-level chopper apparatus 100, as shown in view (b) of FIG. 2. When the reactors 701 and 702 are connected to both the positive pole P and the negative pole N of the direct-current power supply 8, respectively, in the three-level chopper apparatus 100, the two reactors 701 and 702 may be magnetically coupled to each other, as shown in view (c) of FIG. 2.

A capacitor series circuit 41 formed by connecting the capacitors 401 and 402 in series to each other is connected to both ends of the switch series circuit 11 through the diodes 103 and 104, respectively.

The protection switch 201 is connected between the connection point N3 at which the switches 101 and 102 of the switch series circuit 11 are connected to each other and the connection point N4 at which the capacitors 401 and 402 of the capacitor series circuit 41 are connected to each other.

According to the first embodiment, the protection switch 201 is a bidirectional protection switch connected in series to the connection path 13. More specifically, the protection switch 201 includes a switch including a mechanical switching contact or a semiconductor bidirectional switch formed by connecting two semiconductor switches in anti-parallel or in anti-series to each other, and is a switch capable of controlling bidirectional current flow.

The output terminals Po and No on both ends of the capacitor series circuit 41 are connected with a load 9 including an inverter 91 and an electric motor 92. The inverter 91 may be a two-level inverter or a three-level inverter, as shown in FIG. 1.

The control circuit 1a includes a CPU, a memory, etc., for example, and can control each part by running a program or the like stored in the memory. For example, the control circuit 1a is connected to the switch 101, the switch 102, and the protection switch 201, and controls turning on and turning off of each switch by transmitting a control signal to the switch 101, the switch 102, and the protection switch 201.

The control circuit 1a serves as a failure detector. For example, the control circuit 1a includes an unshown voltage detector, acquires a detection result of the connection point N4 (intermediate potential) at which the capacitor 401 and the capacitor 402 are connected in series to each other, and performs control for detecting the failures of the switches 101 and 102 based on the acquired detection result. For example, the control circuit 1a performs control for determining that the switch 101 or 102 has a short circuit failure when a value of the intermediate potential exceeds a range set in advance. Alternatively, for example, the control circuit 1a includes an unshown current detector, acquires a value of a current that flows through the connection path 13, and performs control for detecting the failures of the switches 101 and 102 based on the acquired current value.

(Normal Operation of Three-Level Chopper Apparatus)

The normal operation of the three-level chopper apparatus 100 is now described with reference to FIG. 1. In the three-level chopper apparatus 100, the control circuit 1a performs control processing. As shown in FIG. 1, the protection switch 201 is turned on during the normal operation of the three-level chopper apparatus 100. When both the switches 101 and 102 are first turned on, a current flows from the direct-current power supply 8 to the reactor 701 through the switches 101 and 102, and energy is accumulated in the reactor 701.

Then, the lower-stage switch 102 is turned off. Thus, a current flows through a pathway from the direct-current power supply 8 through the reactor 701, the switch 101, the protection switch 201, the capacitor 402, and the diode 104 to the direct-current power supply 8. Thus, the capacitor 402 is charged by the direct-current power supply 8 and with the energy accumulated in the reactor 701, and hence the capacitor 402 is charged to a predetermined voltage higher than the voltage VE of the direct-current power supply 8.

Then, the switch 102 is turned on, and the upper-stage switch 101 is turned off in a state where energy is accumulated in the reactor 701. Thus, a current flows through a pathway from the direct-current power supply 8 through the reactor 701, the diode 103, the capacitor 401, the protection switch 201, and the switch 102 to the direct-current power supply 8, and the capacitor 401 is charged to a predetermined voltage higher than the voltage VE of the direct-current power supply 8 by the direct-current power supply 8 and with the energy accumulated in the reactor 701.

This is repeated such that voltages to which the capacitors 401 and 402 are charged are adjusted, and voltages of two levels can be extracted from the output terminals Po and No to the load 9 or voltages of three levels can be extracted from the output terminals Po, Mo, and No to the load 9.

This three-level chopper apparatus 100 can convert a direct-current voltage also through the following operation.

Both the switches 101 and 102 are first turned off, whereby a current flows through a pathway from the direct-current power supply 8 through the reactor 701, the diode 103, the capacitor 401, the capacitor 402, and the diode 104 to the direct-current power supply 8, and the capacitors 401 and 402 are charged.

Then, the lower-stage switch 102 is turned on. In this state, the capacitor 401 is charged with a current that flows through the pathway from the direct-current power supply 8 through the reactor 701, the diode 103, the capacitor 401, the protection switch 201, and the switch 102 to the direct-current power supply 8.

From this state, the switch 102 is turned off while the upper-stage switch 101 is turned on such that the capacitor 402 is charged with the current that flows through the pathway from the direct-current power supply 8 through the reactor 701, the switch 101, the protection switch 201, the capacitor 402, and the diode 104 to the direct-current power supply 8. Control for turning on and off the switches 101 and 102 is repeated such that the voltages to which the capacitors 401 and 402 are charged can be adjusted. In this case, a voltage between Po and Mo and a voltage between Mo and No are lower than the voltage VE of the direct-current power supply 8 whereas a voltage between Po and No is higher than VE.

(Operation of Three-Level Chopper Apparatus During Failure)

The operation of the three-level chopper apparatus 100 during the partial failure of the switch series circuit 11 is now described with reference to FIG. 1. In the three-level chopper apparatus 100, the control circuit 1a performs control processing. A case where the switch 101 has a short circuit failure and conducts (fully conducts, for example), for example, is described.

When the switch 101 has a short circuit failure and fully conducts, the switch 102 is turned off and the operation of the inverter 91 is stopped immediately after the failure, whereby the load 9 is separated from the three-level chopper apparatus, and the protection switch 201 is turned off.

In this state, the protection switch 201 is turned off, and hence no current flows through the current pathway R1 but an LC series resonant current created by the reactor 701 and the capacitors 401 and 402 flows through the current pathway R2 from the direct-current power supply 8 through the diode 103, the capacitor 401, the capacitor 402, and the diode 104 to the direct-current power supply 8. Then, the capacitors 401 and 402 are charged with this current. Thus, the sum of the charging voltages of the capacitors 401 and 402 exceeds the voltage VE of the direct-current power supply 8 by energy accumulated in the reactor 701. However, the two capacitors 401 and 402 share the summed voltage, and hence the voltage to which the capacitor 402 is charged is reduced as compared with the case where the protection switch 201 does not disconnect the connection path 13 (current pathway R1), and occurrence of an overvoltage on the capacitor 402 is suppressed.

Even when the diode 103 and the switch 101 each have a short circuit failure, the protection switch 201 is turned off such that the connection path 13 is disconnected, and hence both ends of the capacitor 401 are inhibited from being short-circuited by the diode 103 and the switch 101, each of which has a short circuit failure, and the connection path 13. Thus, the failure of the capacitor 401 caused by a short-circuit current can be suppressed.

[Effects of First Embodiment]

According to the first embodiment, the following effects can be obtained.

According to the first embodiment, as hereinabove described, the protection switch 201 is controllable to change the current pathway R1 through which an overvoltage is applied to the capacitor 402 to the current pathway R2 through which no overvoltage is applied to the capacitor 402 when the switch 101 has a failure. Preferably, the control circuit 1a performs control for turning on or off the protection switch 201 such that the current pathway R1 through which an overvoltage is applied to the capacitor 401 or the capacitor 402 is disconnected when the switch 101 has a failure. Thus, even when the switch 101 has a failure, the current pathway R1 through which an overvoltage is applied to the capacitor 402 is changed to the current pathway R2 through which no overvoltage is applied to the capacitor 402 by the protection switch 201, and hence the charging voltage of the capacitor 402 can be inhibited from becoming an overvoltage.

According to the first embodiment, as hereinabove described, the protection switch 201 is configured as the bidirectional protection switch connected in series to the connection path 13. When the switch 101 or the switch 102 has a failure, the connection path 13 becomes a part of the current pathway R1 through which an overvoltage is applied to the capacitor 402 or the capacitor 401. In view of this point, according to the first embodiment, the protection switch 201 is configured as the bidirectional protection switch connected in series to the connection path 13, whereby the connection path that becomes a part of the current pathway R1 through which an overvoltage is applied to the capacitor 401 or the capacitor 402 can be easily changed to the current pathway R2 through which no overvoltage is applied to the capacitor 401 or the capacitor 402 by the bidirectional protection switch.

In the first embodiment, a case where the switch 101 or both the switch 101 and the diode 103 have a short circuit failure has been described, but also when the switch 102 and/or the diode 104 has a short circuit failure, the protection switch 201 is similarly turned off such that overvoltages on and the failures of the capacitors 401 and 402 can be suppressed. Also in the following embodiments, a case where the switch 101 and the diode 103 have a short circuit failure is described as an example.

Second Embodiment

A three-level chopper apparatus 200 according to a second embodiment is now described with reference to FIGS. 3 and 4.

Figure 3:
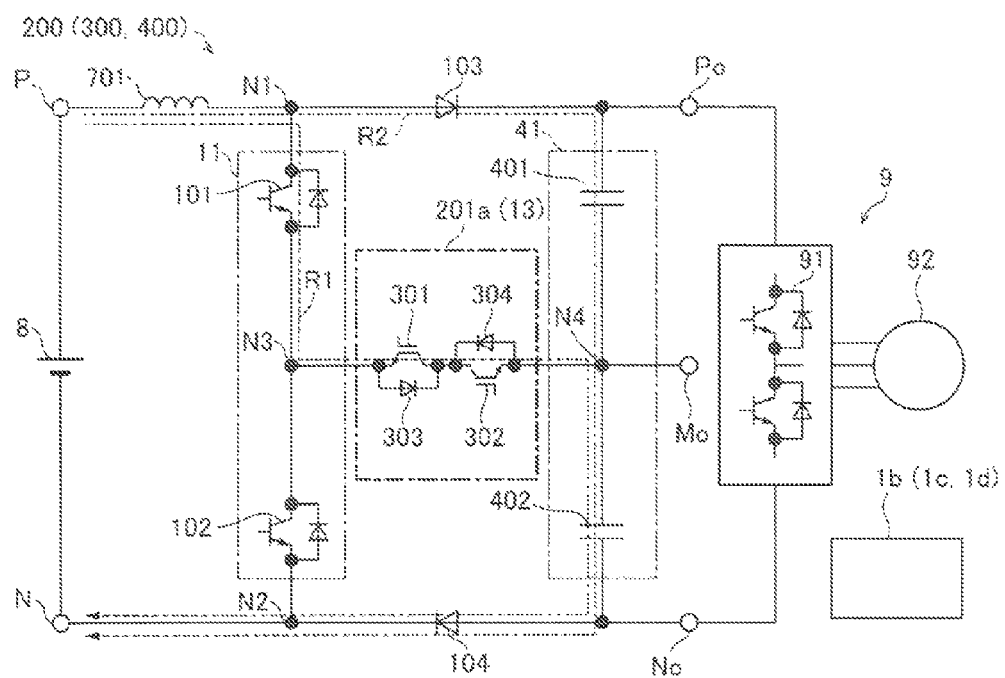
FIG. 3 is a circuit configuration diagram of a three-level chopper apparatus according to second, third, and fourth embodiments of the present invention.

According to the second embodiment, the three-level chopper apparatus 200 includes a protection switch 201a that connects an intermediate point (connection point N3) of a switch series circuit 11 and an intermediate point (connection point N4) of a capacitor series circuit 41, as shown in FIG. 3.

According to the second embodiment, the protection switch 201a is configured as a bidirectional protection switch connected in series to a connection path 13. The protection switch 201a is an example of a "protection switch circuit" or a "bidirectional protection switch" in the claims.

For example, the protection switch 201a includes two IGBTs (insulated gate bipolar transistors) 301 and 302 connected in anti-parallel with diodes 303 and 304, respectively, as shown in FIG. 3. These IGBTs 301 and 302 are connected in anti-series to each other. In other words, the protection switch 201a is configured as a bidirectional switch. A control circuit 1b transmits a control signal to the protection switch 201a to control the protection switch 201a.

Figure 4:
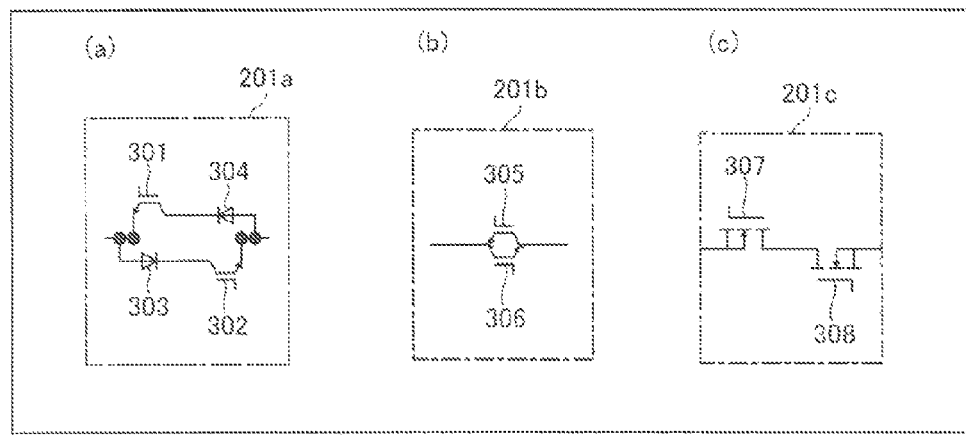
FIG. 4 is a circuit configuration diagram of a three-level chopper apparatus according to a modification of the second embodiment, the third embodiment, and the fourth embodiment of the present invention.

A bidirectional switch used as the protection switch 201a may be constructed by connecting the two IGBTs 301 and 302 connected in series with the diodes 303 and 304 in a forward direction, respectively, in anti-parallel to each other, as shown in view (a) of FIG. 4. Alternatively, the protection switch 201a may include MOSFETs (metal-oxide-semiconductor field-effect transistors) or bipolar transistors instead of the IGBTs 301 and 302.

According to the second embodiment, the diodes 303 and 304 include silicon diodes, silicon carbide diodes, or diodes in which silicon diodes and silicon carbide diodes are connected in parallel to each other.

When the diodes 303 and 304 include the silicon diodes, the diodes 303 and 304 specifically include silicon PN junction diodes (hereinafter referred to as Si-pn diodes) made of a silicon base material. When the diodes 303 and 304 include the silicon carbide diodes, the diodes 303 and 304 specifically include SiC-SB (Schottky barrier) diodes. When the diodes 303 and 304 include the diodes in which silicon diodes and silicon carbide diodes are connected in parallel to each other, the diodes 303 and 304 specifically include diodes in which Si-pn diodes and SiC-SB diodes are connected in parallel to each other. The remaining structures of the three-level chopper apparatus 200 according to the second embodiment are similar to those of the three-level chopper apparatus 100 according to the aforementioned first embodiment.

(Normal Operation According to Second Embodiment)

The normal operation of the three-level chopper apparatus 200 according to the second embodiment is now described with reference to FIG. 3. In the three-level chopper apparatus 200, the control circuit 1b performs control processing. In the three-level chopper apparatus 200, gates of the IGBTs 301 and 302 of the protection switch 201a are first turned on (an ON signal is applied from the control circuit 1b to the gates) such that both the IGBTs 301 and 302 are set in an on-state. Then, control for switching on or off switches 101 and 102 of the switch series circuit 11 is performed such that a direct-current voltage can be converted, similarly to the aforementioned first embodiment.

In this case, the switch 101 is turned on while the switch 102 is turned off such that a capacitor 402 is charged. In this state, the IGBT 302 of the protection switch 201a becomes forward biased, and hence it is required that the gate of the IGBT 302 be turned on to allow a current to flow therein. On the other hand, the IGBT 301 becoming reversely biased may be turned off or on since a current flows through the diode 303.

The switch 101 is turned off while the switch 102 is turned on such that a capacitor 401 is charged. In this state, the IGBT 301 of the protection switch 201a becomes forward biased, and hence it is required that the gate of the IGBT 301 be turned on to allow a current to flow therein. On the other hand, the IGBT 302 becoming reversely biased may be turned off or on since a current flows through the diode 304.

In a mode (period) in which both the switches 101 and 102 are turned on or off, no current flows through the protection switch 201a. In this period, the gates of the two IGBTs 301 and 302 of the protection switch 201a are turned on. Thus, in the period in which no current flows through the protection switch 201a during the normal operation of the three-level chopper apparatus 200, the gates of the two IGBTs 301 and 302 of the protection switch 201a are turned off such that accumulation of charges in the gates of the IGBTs 301 and 302 of the protection switch 201a can be suppressed. When the gates of the IGBTs 301 and 302 are turned off after the elapse of an appropriate period of time from switching on or off the switches 101 and 102, accumulation of charges in the gates can be suppressed while influence on chopper operation is limited.

When the diodes 303 and 304 include the silicon diodes, a current momentarily commutates and a reverse bias is applied to the diodes 303 and 304 if a current that flows through the diodes 303 and 304 is interrupted by switching the switches 101 and 102 during the above normal operation. However, the reverse bias is several volts substantially equal to the saturation voltages of the IGBTs 301 and 302, and no bias is applied in a steady state in which the transient response is finished. In this case, almost no reverse recovery loss is generated in the three-level chopper apparatus 200 according to the second embodiment.

When the diodes 303 and 304 include the silicon carbide diodes, the forward recovery voltage can be reduced during the above normal operation as compared with the case where the Si-pn diodes are used. Thus, the voltage ripple (flow ripple) is reduced such that the noise can be reduced.

(Operation During Failure According to Second Embodiment)

The operation of the three-level chopper apparatus 200 during the partial failure of the switch series circuit 11 is now described with reference to FIG. 3. In the three-level chopper apparatus 200, the control circuit 1b performs control processing. A case where the switch 101 has a short circuit failure and fully conducts, for example, is described.

According to the second embodiment, when the switch 101 of the switch series circuit 11 has a short circuit failure, the gates of the IGBTs 301 and 302 are turned off such that the protection switch 201a is turned off. Thus, the connection path 13 is disconnected, and charging of the capacitor 402 with an LC series resonant current created by the capacitor 402 and a reactor 701 can be suppressed. Thus, overvoltage charging to the capacitor 402 can be suppressed. At this time, it is particularly necessary to turn off the gate of the IGBT 302 of the protection switch 201a that becomes forward biased, but it is safe to turn off both the gates of the IGBTs 301 and 302.

[Effects of Second Embodiment]

According to the second embodiment, the following effects can be obtained.

According to the second embodiment, as hereinabove described, the silicon diodes are provided in the protection switch 201a. Thus, the on-voltage is reduced as compared with the case where the silicon carbide diodes are provided in the protection switch 201a, and hence an increase in a power loss can be suppressed.

According to the second embodiment, as hereinabove described, the silicon carbide diodes are provided in the protection switch 201a. Thus, the forward recovery voltage can be reduced as compared with the case where the silicon diodes are provided in the protection switch 201a. Consequently, the forward recovery voltage is reduced in the three-level chopper apparatus 200, whereby the voltage ripple (flow ripple) is reduced such that the noise can be reduced.

According to the second embodiment, as hereinabove described, the diodes in which silicon diodes and silicon carbide diodes are connected in parallel to each other are provided in the protection switch 201a. Thus, in the three-level chopper apparatus 200, the on-voltage can be reduced while the forward recovery voltage can be reduced, and hence the noise can be reduced while an increase in a power loss is suppressed.

The remaining effects of the three-level chopper apparatus 200 according to the second embodiment are similar to those of the three-level chopper apparatus 100 according to the aforementioned first embodiment.

Third Embodiment

A three-level chopper apparatus 300 according to a third embodiment is now described with reference to FIG. 3 and view (b) of FIG. 4.

According to the third embodiment, the three-level chopper apparatus 300 includes a protection switch 201b inserted into a connection path 13 that connects an intermediate point (connection point N3) of a switch series circuit 11 and an intermediate point (connection point N4) of a capacitor series circuit 41 and a control circuit 1c (see FIG. 3), as shown in view (b) of FIG. 4.

According to the third embodiment, the protection switch 201b is constructed by connecting two reverse blocking IGBTs 305 and 306 in anti-parallel to each other. The control circuit 1c serves as a short circuit detector. The control circuit 1c detects the short circuit failure of a switch 101 when the switch 101 has a short circuit failure, and performs control for turning off a gate of the reverse blocking IGBT 306 of the protection switch 201b to disconnect the connection path 13. The remaining structures and operation of the three-level chopper apparatus 300 according to the third embodiment are similar to those of the three-level chopper apparatus 200 according to the aforementioned second embodiment.

[Effects of Third Embodiment]

According to the third embodiment, the following effects can be obtained.

According to the third embodiment, as hereinabove described, the protection switch 201b is constructed by connecting the reverse blocking IGBTs 305 and 306 in anti-parallel to each other. Thus, according to the aforementioned second embodiment (the structure in which the IGBTs and the diodes are provided in anti-parallel), when the protection switch 201a is turned on, a current must flow through the two elements, i.e. one of the IGBTs and the other diode that is not the corresponding diode. On the other hand, the protection switch 201b according to the third embodiment is constructed by connecting the two IGBTs 305 and 306 having a reverse blocking function in anti-parallel to each other, and hence a current flows through only one element. Thus, a power loss in the three-level chopper apparatus 300 can be reduced as compared with the three-level chopper apparatus 200 according to the second embodiment.

According to the third embodiment, as hereinabove described, the control circuit 1c serves as the short circuit detector. In this short circuit detector, a device (circuit) that detects a switch element having a short circuit failure is incorporated. When the switch 101 has a short circuit failure, the control circuit 1c performs control for turning off the gate of the reverse blocking IGBT 306 of the protection switch 201b and disconnecting the connection path 13. Thus, when the switch 101 has a short circuit failure, the gate of the reverse blocking IGBT 305 becoming reversely biased is turned on, and hence current leakage can be further reduced as compared with the gate of the reverse blocking IGBT 305 is turned off.

Furthermore, in the three-level chopper apparatus, the device that detects the switch element having a short circuit failure is incorporated into the control circuit 1c that serves as the short circuit detector so as to detect the failed switch element, whereby when the switch element has a failure, which of the reverse blocking IGBTs 305 and 306 of the protection switch 201b is turned on and which of the reverse blocking IGBTs 305 and 306 is turned off can be easily controlled. The remaining effects of the three-level chopper apparatus 300 according to the third embodiment are similar to those of the three-level chopper apparatus 200 according to the aforementioned second embodiment.

Fourth Embodiment

A three-level chopper apparatus 400 according to a fourth embodiment is now described with reference to FIG. 3 and view (c) of FIG. 4.

According to the fourth embodiment, a protection switch 201c constructed by connecting MOSFETs 307 and 308 in anti-series to each other is arranged between an intermediate point (connection point N3) of a switch series circuit 11 and an intermediate point (connection point N4) of a capacitor series circuit 41 in the three-level chopper apparatus 400, as shown in view (c) of FIG. 4. Also when reverse conducting IGBTs are used instead of the MOSFETs, the same behavior is exhibited. When the reverse conducting IGBTs with both the functions of an IGBT and a freewheeling diode are used in one chip, it is not necessary to connect the diodes 303 and 304 according to the second embodiment, and hence the three-level chopper apparatus 400 can be downsized.

The three-level chopper apparatus 400 includes a control circuit 1d. According to the fourth embodiment, the control circuit 1d controls the MOSFETs 307 and 308 to perform synchronous rectification during a period in which a current flows through a connection path 13 in the three-level chopper apparatus 400. The remaining structures of the three-level chopper apparatus 400 according to the fourth embodiment are similar to those of the three-level chopper apparatus 100 according to the aforementioned first embodiment.

(Operation of Three-Level Chopper Apparatus According to Fourth Embodiment)

In the three-level chopper apparatus 400 according to the fourth embodiment, the control circuit 1d performs control processing. During the normal operation of the three-level chopper apparatus 400, gates of both the MOSFETs 307 and 308 of the protection switch 201c are turned on such that the protection switch 201c is turned on. In an operation mode (operation period) in which a current flows through the connection path 13 that connects the intermediate point (connection point N3) of the switch series circuit 11 and the intermediate point (connection point N4) of the capacitor series circuit 41, synchronous rectification is performed in a state where the gate of the MOSFET 307 or 308 of the protection switch 201c that becomes forward biased is turned on to allow a current to flow therein while the gate of the MOSFET 307 or 308 that becomes reversely biased is also turned on such that the MOSFET 307 or 308 conducts. When the gate of the MOSFET 307 or 308 that becomes reversely biased is turned off, a current flows through a body diode of the MOSFET 307 or 308, but a power loss is increased, and hence the gate of the MOSFET 307 or 308 is preferably turned on.

In an operation mode (operation period) in which no current flows through the connection path 13 of the three-level chopper apparatus, the gates of the MOSFETs 307 and 308 may be turned off to turn off the protection switch 201*c*. Also during normal operation, when the gates of the MOSFETs 307 and 308 of the protection switch 201*c* are turned off in a period in which the operation of the chopper apparatus is not influenced, accumulation of charges in the gates can be suppressed. When the gates of the MOSFETs 307 and 308 are turned off, an appropriate period of time for switching is provided after switching on or off of switches 101 and 102 such that the operation of the three-level chopper apparatus 400 is not influenced. When the synchronous rectification function of the MOSFETs 307 and 308 is utilized, the number of diodes elements can be reduced as compared with the case where MOSFET modules in which diodes are connected in anti-parallel are used, and hence the structure of the three-level chopper apparatus 400 can be simplified.

When the switch 101 has a short circuit failure in the switch series circuit 11 of the three-level chopper apparatus, for example, the connection path 13 is disconnected by turning off the gates of the MOSFETs 307 and 308 to turn off the protection switch 201*c*. At this time, it is particularly necessary to always turn off the gate of the MOSFET of the protection switch 201*c* that becomes forward biased to turn off the protection switch 201*c*. When the gates of both the MOSFETs 307 and 308 are tuned off, the control is facilitated.

[Effects of Fourth Embodiment]

According to the fourth embodiment, the following effects can be obtained.

According to the fourth embodiment, as hereinabove described, the protection switch 201*c* constructed by connecting the MOSFETs 307 and 308 in anti-series to each other is arranged between the intermediate point (connection point N3) of the switch series circuit 11 and the intermediate point (connection point N4) of the capacitor series circuit 41 in the three-level chopper apparatus 400. Thus, in a state where the gate of the MOSFET 307 or 308 of the protection switch 201*c* that becomes forward biased is turned on to allow a current to flow therein while the gate of the MOSFET 307 or 308 that becomes reversely biased is also turned on such that the MOSFET 307 or 308 conducts, synchronous rectification can be performed, and hence a power loss in the protection switch 201*c* can be reduced. When the gate of the MOSFET 307 or 308 that becomes reversely biased is turned off, a current flows through a body diode of the MOSFET 307 or 308, but a power loss is increased, and hence the gate of the MOSFET 307 or 308 is preferably turned on.

According to the fourth embodiment, as hereinabove described, the control circuit 1*d* controls the MOSFETs 307 and 308 to perform synchronous rectification during the period in which a current flows through the connection path 13 in the three-level chopper apparatus 400. In general, when the synchronous rectification function of MOSFETs is utilized and is applied to a switch element of an inverter or a chopper, it is necessary to provide a period in which only body diodes of the MOSFETs conduct by providing a dead time before and after switching not to cause a short circuit at the time of switching. For application according to the fourth embodiment, on the other hand, it is not necessary to provide a dead time for providing a period in which only the body diodes conduct, and hence control processing is not complicated even when synchronous rectification is performed. The remaining effects of the three-level chopper apparatus 400 according to the thirteenth embodiment are similar to those of the three-level chopper apparatus 100 according to the aforementioned first embodiment.

Fifth Embodiment

A three-level chopper apparatus 500 according to a fifth embodiment is now described with reference to FIG. 5.

Figure 5:
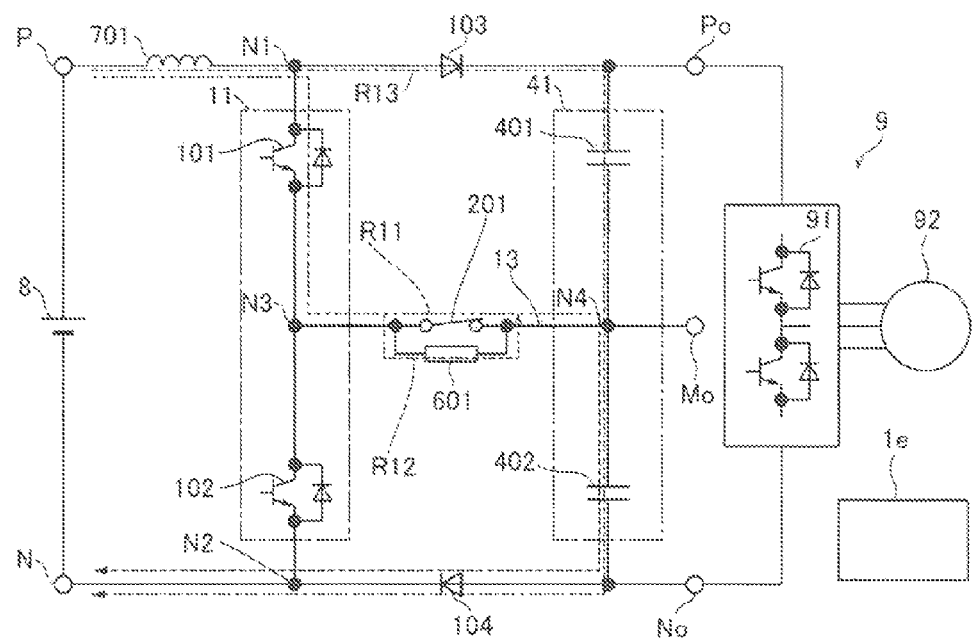
FIG. 5 is a circuit configuration diagram of a three-level chopper apparatus according to a fifth embodiment of the present invention.

According to the fifth embodiment, the three-level chopper apparatus 500 includes a protection switch 201 inserted between an intermediate point (connection point N3) of a switch series circuit 11 and an intermediate point (connection point N4) of a capacitor series circuit 41 and a resistance 601 connected in parallel to the protection switch 201, as shown in FIG. 5.

According to the fifth embodiment, the three-level chopper apparatus 500 also includes a control circuit 1*e*. In the three-level chopper apparatus 500, the control circuit 1*e* performs control for changing a current pathway R11 through which an overvoltage is applied to a capacitor 401 or a capacitor 402 to current pathways R12 and R13 through which no overvoltage is applied to the capacitor 401 or the capacitor 402 when a switch 101 or a switch 102 has a failure. The resistance 601 is an example of a "first resistance" in the claims.

The protection switch 201 can be configured as a bidirectional switch constructed by connecting IGBTs and diodes in anti-parallel to each other and connecting the IGBTs in anti-series to each other while connecting the diodes in anti-series to each other, similarly to the protection switch 201*a* according to the aforementioned second embodiment shown in FIG. 3. Similarly to the second embodiment, Si-pn diodes, SiC-SB diodes, or diodes in which Si-pn diodes and SiC-SB diodes are connected in parallel to each other can be used as diodes of this bidirectional switch. The protection switch 201 can also be constructed like the protection switch 201*b* according to the third embodiment or the protection switch 201*c* according to the fourth embodiment.

According to the fifth embodiment, the three-level chopper apparatus 500 is configured such that a resistance value Re satisfies the following formula (5) or (6), letting Re be the resistance value of the resistance 601, L be the inductance of a reactor 701, and C2 be the capacity of the capacitor 402.

$$Re = 2 \times (2 \times L/C2)^{1/2} \quad (5)$$

$$Re > 2 \times (2 \times L/C2)^{1/2} \quad (6)$$

When a reactor provided in a positive circuit or a negative circuit or a combination reactor constructed by combining those reactors is used as the reactor 701, the self-inductance of this reactor or the sum of the self-inductances and the mutual inductance of those reactors is used as the inductance L. As the two capacitors 401 and 402 of the capacitor series circuit 41, capacitors having the same capacity are generally used. When capacitors having different capacities are used, on the other hand, the capacity value C of the smaller of the capacity of the capacitor 401 and the capacity of the capacitor 402 is used to allow the resistance value Re of the resistance 601 to satisfy the following formula (7), whereby a formed LCR series resonant circuit can be critically damped or overdamped even when any of the switches 101 and 102 has a short circuit failure.

$$Re \geq 2 \times (2 \times L/C)^{1/2} \quad (7)$$

The remaining structures of the three-level chopper apparatus 500 according to the fifth embodiment are similar to those of the three-level chopper apparatus 100 according to the aforementioned first embodiment.

(Operation of Three-Level Chopper Apparatus According to Fifth Embodiment)

In the three-level chopper apparatus 500 according to the fifth embodiment, the control circuit 1e performs control processing. During the normal operation of this three-level chopper apparatus according to the fifth embodiment, the protection switch 201 is turned on such that no current flows through the resistance 601. When the protection switch 201 is constructed like the protection switch according to the aforementioned second, third, or fourth embodiment, the same operation can be obtained.

When the switch 101 has a short circuit failure in the switch series circuit 11 of the three-level chopper apparatus 500, for example, the control circuit 1e turns off the protection switch 201. In this state, the resistance 601 is inserted between the intermediate point of the switch series circuit 11 and the intermediate point of the capacitor series circuit 41.

In this state, an LC series resonant current flows through the current pathway R12 from a direct-current power supply 8 through the reactor 701, the switch 101 having a short circuit failure, the resistance 601, the capacitor 402, and a diode 104 to the direct-current power supply 8 and the current pathway R13 from the direct-current power supply 8 through the reactor 701, a diode 103, the capacitor 401, the capacitor 402, and the diode 104 to the direct-current power supply 8. The capacitors 401 and 402 are charged with this current.

When the current from the direct-current power supply 8 starts to be reduced as the charging progresses, the voltage of the resistance 601 is reduced (a potential difference between both ends of the resistance 601 is reduced). A potential difference between both ends of the diode 103 is substantially constant, and hence the potential difference of the diode 103 becomes larger than that of the resistance 601 such that a current flows through only the current pathway R12.

When the switch 101 has a short circuit failure in an operating state where the voltages of the capacitors 401 and 402 are lower than the voltage VE of the direct-current power supply 8, the current that flows through the resistance 601 is reduced before the voltage of the capacitor 402 reaches VE. When the resistance value of the resistance 601 is relatively large, the current starts to be reduced at a relatively early stage, and an increase in the voltage of the capacitor 401 can be suppressed. When the switch 101 has a short circuit failure in an operating state where the voltages of the capacitors 401 and 402 are higher than the voltage VE of the direct-current power supply 8, the current from the direct-current power supply 8 is reduced without being increased, and hence the capacitor 402 is charged through only the current pathway R12.

At this time, damped oscillation occurs in the LCR series resonant circuit since the LCR series resonant circuit in the three-level chopper apparatus 500 includes the resistance 601. A current is limited by the resistance 601, and hence the amount of charges that flows into the capacitor 402 is reduced such that occurrence of an overvoltage on the capacitor 402 can be prevented. According to the fifth embodiment, when the resistance value Re satisfies the above formula (5), the LCR series resonant circuit is critically damped, and oscillation of the resonant circuit is suppressed. When the resistance value Re satisfies the above formula (6), the LCR series resonant circuit is overdamped, and oscillation of the resonant circuit is further suppressed.

When the LCR series resonant circuit is critically damped or overdamped, an attained value of the voltage of the capacitor 402 does not exceed the voltage VE of the direct-current power supply 8 but occurrence of an overvoltage on the capacitor 402 is suppressed if the switch 101 has a short circuit failure in the operating state where the voltages of the capacitors 401 and 402 are lower than the voltage VE of the direct-current power supply 8. The remaining operation of the three-level chopper apparatus 500 according to the fifth embodiment is similar to that of the three-level chopper apparatus 100 according to the aforementioned first embodiment.

[Effects of Fifth Embodiment]

According to the fifth embodiment, the following effects can be obtained.

According to the fifth embodiment, as hereinabove described, the resistance 601 connected in parallel to the protection switch 201 is provided in the three-level chopper apparatus 500. Thus, when the switch 101 has a short circuit failure and control for turning off the protection switch 201 is performed, for example, an LC series resonant current flows through the current pathway R12. In this case, the resistance 601 is included in the current pathway R12, and hence this current pathway R12 forms an LCR series resonant circuit. A resonant current that flows through this LCR series resonant circuit undergoes damped oscillation. Consequently, the amount of charges that flows into the capacitor 402 is reduced, and hence occurrence of an overvoltage on the capacitor 402 can be suppressed. The remaining effects of the three-level chopper apparatus 500 according to the fifth embodiment are similar to those of the three-level chopper apparatus 100 according to the aforementioned first embodiment.

Sixth Embodiment

A three-level chopper apparatus 600 according to a sixth embodiment is now described with reference to FIG. 6.

Figure 6:
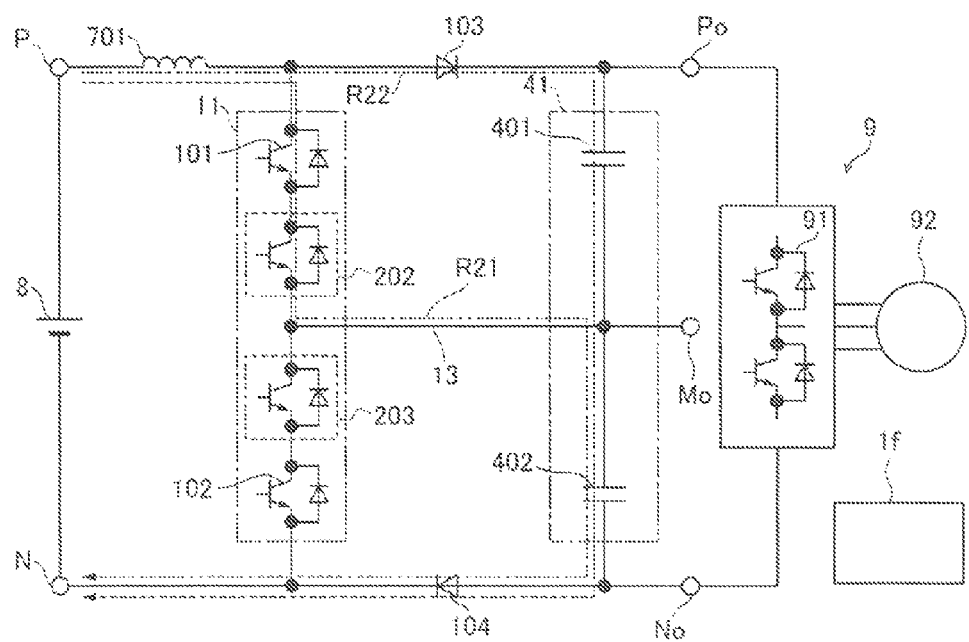
FIG. 6 is a circuit configuration diagram of a three-level chopper apparatus according to a sixth embodiment of the present invention.

According to the sixth embodiment, in the three-level chopper apparatus 600, a protection switch 202 is connected in series to a switch 101 of a switch series circuit 11, and a protection switch 203 is connected in series to a switch 102 of the switch series circuit 11, as shown in FIG. 6. The three-level chopper apparatus 600 includes a control circuit 1f.

According to the sixth embodiment, the control circuit if performs control for changing a current pathway R21 through which an overvoltage is applied to a capacitor 401 or a capacitor 402 to a current pathway R22 through which no overvoltage is applied to the capacitor 401 or the capacitor 402 when the switch 101 or the switch 102 has a failure. The protection switch 202 is an example of an "eleventh protection switch" or a "first protection switch partial circuit" in the claims. The protection switch 203 is an example of a "fourteenth protection switch" or a "second protection switch partial circuit" in the claims.

As the protection switches 202 and 203, IGBTs or MOSFETs can be used independently, and parallel connection of diodes can also be omitted. According to the sixth embodiment, series connection order of the switches 101 and 102 and the protection switches 202 and 203 that are main components is not restricted to one shown in FIG. 6, but the switches 101 and 102 and the protection switches 202 and 203 can be connected in any order. When the switch 101 has a failure, the protection switch 203 may be turned off instead of turning off the switch 102. The remaining structures of the three-level chopper apparatus 600 according to the sixth embodiment are similar to those of the three-level chopper apparatus 100 according to the aforementioned first embodiment.

(Operation of Three-Level Chopper Apparatus According to Sixth Embodiment)

In the three-level chopper apparatus 600 according to the sixth embodiment, the control circuit 1f performs control processing. When the switch 101 is turned on during the normal operation of the three-level chopper apparatus 600, the protection switch 202 connected in series to the switch 101 must be turned on to perform a chopper operation. When the switch 102 is turned on, the protection switch 203 connected in series to the switch 102 must be turned on to perform a chopper operation. The switches 101 and 102 are switched on and off similarly to the aforementioned first embodiment, for example, whereby the normal operation of the three-level chopper apparatus is enabled.

When the switch 101 has a short circuit failure in the switch series circuit 11 of the three-level chopper apparatus 600, for example, the switch 102 and the protection switch 202 are turned off. Thus, the switch series circuit 11 is blocked, and hence the capacitors 401 and 402 are charged by a direct-current power supply 8 and with energy accumulated in a reactor 701. Although at this time, a charging current becomes an LC series resonant current, the two capacitors 401 and 402 share the charging voltage and are charged, and hence the voltage of each of the capacitors is inhibited from becoming an overvoltage.

[Effects of Sixth Embodiment]

According to the sixth embodiment, the following effects can be obtained.

According to the sixth embodiment, as hereinabove described, both the protection switch 202 connected in series to the switch 101 of the switch series circuit 11 and the protection switch 203 connected in series to the switch 102 of the switch series circuit 11 are provided in the three-level chopper apparatus 600. Thus, when the switch 101 or 102 has a short circuit failure, the protection switches 202 and 203 can effectively change the current pathway R21 through which an overvoltage is applied to the capacitor 401 or 402 to the current pathway R22 through which no overvoltage is applied to the capacitor 401 or 402.

According to the sixth embodiment, as hereinabove described, the protection switch 202 is provided in the three-level chopper apparatus 600. Furthermore, the protection switch 202 is connected in series to the switch 101 and a connection path 13. Thus, when the switch 101 has a short circuit failure, the protection switch 202 is turned off such that the current pathway R21 through which an overvoltage is applied to the capacitor 402 can be changed to the current pathway R22 through which no overvoltage is applied to the capacitor 402.

According to the sixth embodiment, as hereinabove described, the protection switch 203 is provided in the three-level chopper apparatus 600. Furthermore, the protection switch 203 is connected in series to the switch 102 and the connection path 13. Thus, similarly to the case where the protection switch 202 is provided in the three-level chopper apparatus 600, application of an overvoltage to the capacitor 401 can be suppressed.

In the case where a protection switch 201a is provided in the connection path 13 as in the aforementioned second embodiment, two elements including IGBTs or MOSFETs are added in a current flow pathway when only one of the capacitors 401 and 402 is charged during normal operation, but according to the sixth embodiment, only one switch element is added in a current flow pathway, and hence a conduction loss can be reduced as compared with the aforementioned second embodiment in which the bidirectional switch is provided. Thus, the efficiency of the three-level chopper apparatus 600 can be increased. However, in a mode in which both the switches 101 and 102 are turned on, no loss is caused by the protection switch circuit according to the first to fifth embodiments, but a loss is caused by the two protection switches according to the sixth embodiment. Thus, the first to fifth embodiments also have an advantage. The remaining effects of the three-level chopper apparatus 600 according to the sixth embodiment are similar to those of the three-level chopper apparatus 100 according to the aforementioned first embodiment.

Seventh Embodiment

A three-level chopper apparatus 700 according to a seventh embodiment is now described with reference to FIG. 7.

Figure 7:
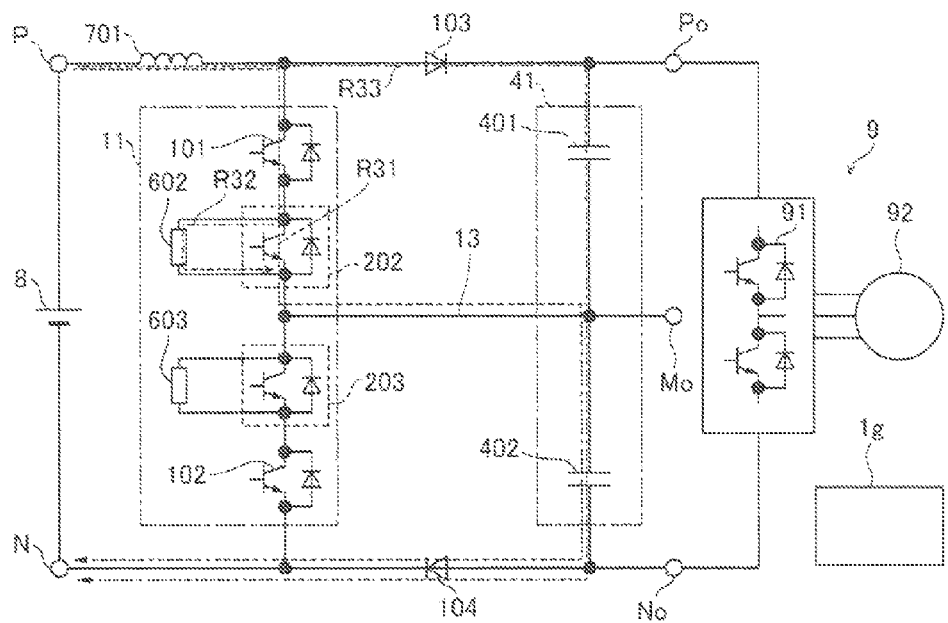
FIG. 7 is a circuit configuration diagram of a three-level chopper apparatus according to a seventh embodiment of the present invention.

According to the seventh embodiment, in the three-level chopper apparatus 700, resistances 602 and 603 are connected in parallel to the protection switches 202 and 203 connected in series to the switches 101 and 102 according to the aforementioned sixth embodiment, respectively, as shown in FIG. 7. The three-level chopper apparatus 700 includes a control circuit 1g. The protection switches 202 and 203 according to the seventh embodiment are examples of a "twelfth protection switch" and a "fifteenth protection switch" in the claims, respectively. The resistance 602 is an example of a "fifth resistance" or a "first protection switch partial circuit" in the claims. The resistance 603 is an example of a "sixth resistance" or a "second protection switch partial circuit" in the claims.

According to the seventh embodiment, the control circuit 1g can perform control for changing a current pathway R31 through which an overvoltage is applied to a capacitor 401 or 402 to current pathways R32 and R33 through which no overvoltage is applied to the capacitor 401 or 402 when the switch 101 or 102 has a failure.

According to the seventh embodiment, the resistance value Rc1 of this resistance 602 is set to a value shown by the following formula (8), similarly to the fifth embodiment, whereby a resonant circuit on the pathway R32 can be critically damped or overdamped. Thus, when the switch 101 has a short circuit failure in an operating state where the voltages of the capacitors 401 and 402 are lower than the voltage VE of a direct-current power supply 8, the charging voltage of the capacitor 402 can be kept to the voltage VE of the direct-current power supply 8. Consequently, occurrence of an overvoltage on the capacitor 402 can be suppressed.

$$Rc1 \geq 2 \times (2 \times L/C2)^{1/2} \tag{8}$$

Similarly, according to the seventh embodiment, the resistance value Rd1 of the resistance 603 is set to a value that satisfies the following formula (9), whereby the voltage of the capacitor 401 can be kept to the voltage VE of the direct-current power supply 8 when the switch 102 has a short circuit failure.

$$Rd1 \geq 2 \times (2 \times L/C1)^{1/2} \tag{9}$$

Even when a diode 103 and the switch 101 each have a short circuit failure in the three-level chopper apparatus 700 according to the seventh embodiment, an overvoltage on the capacitor 402 and the failure of the capacitor 401 can be suppressed by the resistance 602, similarly to the aforementioned fifth embodiment.

Also according to this seventh embodiment, the switches 101 and 102 and the protection switches 202 and 203 can be connected in any order. The remaining structures of the three-level chopper apparatus 700 according to the seventh embodiment are similar to those of the three-level chopper apparatus 600 according to the aforementioned sixth embodiment.

(Operation of Three-Level Chopper Apparatus According to Seventh Embodiment)

When the switch 101 has a short circuit failure, the switch 102 and the protection switch 202 are turned off. In this state, an LC series resonant current flows through the current pathway R32 from the direct-current power supply 8 through a reactor 701, the switch 101 having a short circuit failure, the resistance 602, the capacitor 402, and a diode 104 to the direct-current power supply 8 and the current pathway R33 from the direct-current power supply 8 through the reactor 701, the diode 103, the capacitor 401, the capacitor 402, and the diode 104 to the direct-current power supply 8. The capacitors 401 and 402 are charged with this current. Similarly to the fifth embodiment, when the current is reduced as the charging progresses, no current flows through the current pathway R33, and only an LCR series resonant circuit on the pathway R32, in which damped oscillation occurs, is formed. Thus, the amount of charges that flows into the capacitor 402 is reduced by the resistance 602, and occurrence of an overvoltage on the capacitor 402 is suppressed.

[Effects of Seventh Embodiment]

According to the seventh embodiment, the following effects can be obtained.

According to the seventh embodiment, as hereinabove described, the protection switches 202 and 203, the resistance 602 connected in parallel to the protection switch 202, and the resistance 603 connected in parallel to the protection switch 203 are provided in the three-level chopper apparatus 700. Thus, when the switch 101 or 102 has a short circuit failure, control for turning off the protection switch 202 or 203 is performed, whereby the resistance 602 or 603 can be added in the current pathway (current pathway R32, for example). Consequently, when the switch 101 or 102 has a short circuit failure, the current pathway can be formed as an LCR series resonant circuit including the resistance 602 or 603, and hence occurrence of an overvoltage on the capacitor 401 or 402 can be suppressed.

According to the seventh embodiment, as hereinabove described, the resistance value Rc1 of the resistance 602 satisfies the above formula (8) where Rc1 represents the resistance value of the resistance 602, L represents the inductance of the reactor 701, and C2 represents the capacity of the capacitor 402. Furthermore, the resistance value Rd1 of the resistance 603 satisfies the above formula (9) where Rd1 represents the resistance value of the resistance 603, L represents the inductance of the reactor 701, and C1 represents the capacity of the capacitor 401. Thus, a current that flows through the LCR series resonant circuit including the resistance 602 having the resistance value Rc1 or the resistance 603 having the resistance value Rd1 can be critically damped or overdamped, and hence occurrence of an overvoltage on the capacitor 401 or 402 can be more reliably suppressed when the switch 101 or 102 has a short circuit failure. The remaining effects of the three-level chopper apparatus 700 according to the seventh embodiment are similar to those of the three-level chopper apparatus 600 according to the aforementioned sixth embodiment.

Eighth Embodiment

A three-level chopper apparatus 800 according to an eighth embodiment is now described with reference to FIG. 8.

Figure 8:
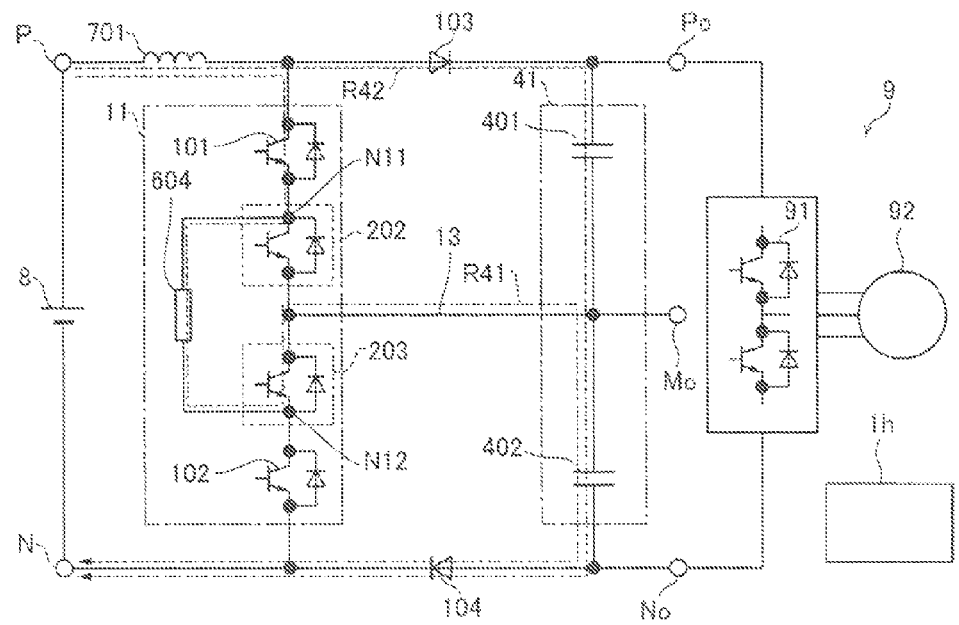
FIG. 8 is a circuit configuration diagram of a three-level chopper apparatus according to an eighth embodiment of the present invention.

According to the eighth embodiment, in the three-level chopper apparatus 800, a resistance 604 is connected in parallel between a connection point N11 between the switch 101 and the protection switch 202 according to the aforementioned sixth embodiment and a connection point N12 between the switch 102 and the protection switch 202 according to the aforementioned sixth embodiment, as shown in FIG. 8. The protection switches 202 and 203 according to the eighth embodiment are examples of a "first protection switch" and a "second protection switch" in the claims, respectively. The resistance 604 is an example of a "second resistance" in the claims.

The protection switches 202 and 203 are configured such that a current can flow and return to a direct-current power supply 8 therethrough. The protection switches 202 and 203 include MOSFETs, IGBTs having diodes connected in anti-parallel, reverse conducting IGBTs, or the like. The three-level chopper apparatus 800 includes a control circuit 1h.

The resistance value Ra1 of this resistance 604 is set to a value that satisfies the following formula (10) or (11), similarly to the aforementioned fifth embodiment.

$$Ra1 \geq 2 \times (2 \times L/C2)^{1/2} \quad (10)$$

$$Ra1 \geq 2 \times (2 \times L/C)^{1/2} \quad (11)$$

In the case where as the protection switches 202 and 203, switches constructed by connecting diodes in anti-parallel to switching elements such as IGBTs to allow a current to flow and return to the direct-current power supply 8 therethrough are used, freewheeling diodes to be connected conduct only when the switch 101, for example, has a failure and the protection switches 202 and 203 are turned off, and during normal operation, no large reverse bias is applied, or no reverse recovery loss is generated since the freewheeling diodes do not conduct. Therefore, inexpensive Si-pn diodes can be used. When it is necessary to reduce a noise at the time of commutation during normal operation, SiC-SB diodes, which are excellent in forward recovery characteristics, are preferably used as the freewheeling diodes to be connected.

The remaining structures of the three-level chopper apparatus 800 according to the eighth embodiment are similar to those of the three-level chopper apparatus 600 according to the aforementioned sixth embodiment.

(Operation of Three-Level Chopper Apparatus According to Eighth Embodiment)

The protection switches 202 and 203 according to this eighth embodiment operate similarly to those according to the aforementioned seventh embodiment. In other words, during the normal operation of the three-level chopper apparatus, both the protection switches 202 and 203 are turned on, and the resistance 604 is short-circuited such that no current flows through the resistance 604.

When the switch 101 has a short circuit failure in a switch series circuit 11 of the three-level chopper apparatus, for example, the switch 102 and the protection switch 202 are immediately turned off.

In this state, an LC series resonant current flows through a pathway R41 from the direct-current power supply 8 through a reactor 701, the switch 101 having a short circuit failure, the resistance 604, the protection switch 203 (through which a current can flow and return to the direct-current power supply 8), a capacitor 402, and a diode 104 to the direct-current power supply 8 and a pathway R42 from the direct-current power supply 8 through the reactor 701, a diode 103, a capacitor 401, the capacitor 402, and the diode 104 to the direct-current power supply 8. The capacitors 401 and 402 are charged with this current. Similarly to the fifth embodiment, when the current is reduced as the charging progresses, no current flows through the pathway R42, and only an LCR series resonant circuit on the pathway R41, in which damped oscillation occurs, is formed. Thus, the amount of charges that flows into the capacitor 402 is reduced by the resistance 604, and hence occurrence of an overvoltage on the capacitor 402 can be suppressed.

The resistance Ra1 of the resistance 604 is set to a value that satisfies the following formula (10), whereby the resonant circuit on the pathway R41 is critically damped or overdamped. Thus, when the switch 101 has a short circuit failure in an operating state where the voltages of the capacitors 401 and 402 are lower than the voltage VE of the direct-current power supply 8, the charging voltage of the capacitor 402 can be kept to the voltage VE of the direct-current power supply 8, and occurrence of an overvoltage on the capacitor 402 can be suppressed.

The capacity value C of the smaller of the capacity of the capacitor 401 and the capacity of the capacitor 402 is used to allow the resistance value Ra1 of the resistance 604 to satisfy the above formula (11), whereby a formed LCR series resonant circuit can be critically damped or overdamped even when any of the switches 101 and 102 has a short circuit failure.

Even when a diode 103 and the switch 101 each have a short circuit failure, an overvoltage on the capacitor 402 and the failure of the capacitor 401 can be suppressed by the resistance 604, similarly to the aforementioned fifth embodiment.

[Effects of Eighth Embodiment]

According to the eighth embodiment, the following effects can be obtained.

According to the eighth embodiment, as hereinabove described, the protection switch 202 connected in series between the switch 101 and a connection path 13, the protection switch 203 connected in series between the switch 102 and the connection path 13, and the resistance 604 connected in parallel between the connection point N11 between the switch 101 and the protection switch 202 and the connection point N12 between the switch 102 and the protection switch 202 are provided in the three-level chopper apparatus 800. Thus, when the switch 101 has a short circuit failure and control for turning off the protection switch 202 and turning on the protection switch 203 is performed, for example, an LC series resonant current flows through the pathway R41 from the direct-current power supply 8 through the reactor 701, the switch 101 having a short circuit failure, the resistance 604, the protection switch 203, the capacitor 402, and the diode 104 to the direct-current power supply 8. In this case, the resistance 604 is included in the current pathway R41, and hence this current pathway R41 forms an LCR series resonant circuit. A resonant current that flows through this LCR series resonant circuit undergoes damped oscillation. Consequently, the amount of charges that flows into the capacitor 402 is reduced, and hence occurrence of an overvoltage on the capacitor 402 can be further suppressed.

According to the eighth embodiment, as hereinabove described, the resistance Ra1 of the resistance 604 satisfies the above formula (10) or (11). Thus, a current that flows through the LCR series resonant circuit including the resistance 604 having the resistance value Ra1 can be critically damped or overdamped, and hence occurrence of an overvoltage on the capacitor 401 or 402 can be more reliably suppressed when the switch 101 or 102 has a short circuit failure.

The remaining effects of the three-level chopper apparatus 800 according to the eighth embodiment are similar to those of the three-level chopper apparatus 600 according to the aforementioned sixth embodiment.

Ninth Embodiment

A three-level chopper apparatus 900 according to a ninth embodiment is now described with reference to FIG. 9.

Figure 9:
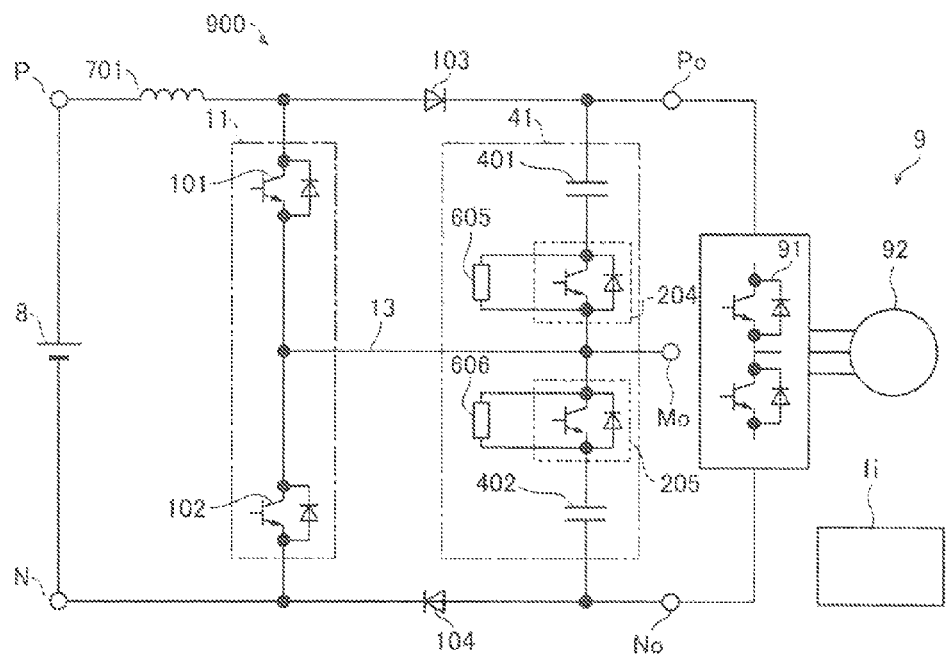
FIG. 9 is a circuit configuration diagram of a three-level chopper apparatus according to a ninth embodiment of the present invention.

The three-level chopper apparatus 900 according to the ninth embodiment includes a parallel circuit of a protection switch 204 and a resistance 605 and a parallel circuit of a protection switch 205 and a resistance 606 in a capacitor series circuit 41, as shown in FIG. 9. The three-level chopper apparatus 900 includes a control circuit 1i. The remaining structures of the three-level chopper apparatus 900 according to the ninth embodiment are similar to those of the three-level chopper apparatus 700 according to the aforementioned seventh embodiment, for example. Although the protection switches 204 and 205 are required to be capable of switching on and off a current that attempts to flow from the side of a capacitor 401 to the side of a capacitor 402, a current in an opposite direction is only required to be capable of conducting. Since the protection switches 204 and 205 are configured such that a current can flow and return to a direct-current power supply 8 therethrough, flow of a current from the capacitors 401 and 402 to the side of a load 9 is not prevented. Thus, as the protection switches 204 and 205, MOSFETs, IGBTs in which diodes are connected in anti-parallel, or the like can be used. The protection switches 204 and 205 are examples of a "fifteenth protection switch" and a "twelfth protection switch" in the claims, respectively. The resistances 605 and 606 are examples of a "sixth resistance" and a "fifth resistance" in the claims, respectively.

In the three-level chopper apparatus 900 according to this ninth embodiment, similarly to another embodiment, control for switching on and off switches 101 and 102 of a switch series circuit 11 is performed in a state where the protection switches 204 and 205 of the capacitor series circuit 41 are turned on and the resistances 605 and 606 are short-circuited during normal operation such that a direct-current voltage is converted.

When the switch 101 has a short circuit failure in the switch series circuit 11 of the three-level chopper apparatus 900, for example, the switch 102 and the protection switch 205 are immediately turned off, and the resistance 606 is arranged in the charging path of the capacitor 402.

In this state, an LC series resonant current flows through a pathway from the direct-current power supply 8 through a reactor 701, the switch 101 having a short circuit failure, the resistance 606, the capacitor 402, and a diode 104 to the direct-current power supply 8. The capacitor 402 is charged with this current. Thus, the amount of charges that flows into the capacitor 402 is reduced by the resistance 606, and hence occurrence of an overvoltage on the capacitor 402 can be prevented.

Similarly to the aforementioned seventh embodiment, the resistance value Rc2 of this resistance 606 is set to a value shown by the following formula (12), whereby a resonant circuit on the above pathway can be critically damped or overdamped. Thus, when the switch 101 has a short circuit failure in an operating state where the voltages of the capacitors 401 and 402 are lower than the voltage VE of the direct-current power supply 8, the charging voltage of the capacitor 402 can be kept to the voltage VE of the direct-current power supply 8. Consequently, occurrence of an overvoltage on the capacitor 402 can be suppressed. Similarly, the resistance value Rd2 of the resistance 605 is set to a value shown by the following formula (13), whereby when the switch 102 has a short circuit failure in the operating state where the voltages of the capacitors 401 and 402 are lower than the voltage VE of the direct-current power supply 8, the voltage of the capacitor 401 can be kept to the voltage VE of the direct-current power supply 8.

$$Rc2 \geq 2 \times (2 \times L/C2)^{1/2} \qquad (12)$$

$$Rd2 \geq 2 \times (2 \times L/C1)^{1/2} \qquad (13)$$

When a diode 103 and the switch 101 each have a short circuit failure, the switch 102 and the protection switch 205 are turned off such that the resistance 606 is inserted into the charging path of the capacitor 402. A current flow pathway from the direct-current power supply 8 becomes the pathway from the direct-current power supply 8 through the reactor 701, the switch 101 having a short circuit failure, the resistance 606, the capacitor 402, and the diode 104 to the direct-current power supply 8. This pathway is the same as when only the switch 101 has a failure, and hence an overvoltage on the capacitor 402 can be prevented also in this case. Furthermore, the resistance value Rc2 of this resistance 606 is set to the value shown by the above formula (12), and the resistance value Rd2 of this resistance 605 is set to the value shown by the above formula (13), whereby the charging voltage of the capacitor 402 can be kept to the voltage VE of the direct-current power supply 8 when the switch 101 has a short circuit failure in the operating state where the voltages of the capacitors 401 and 402 are lower than the voltage VE of the direct-current power supply 8.

According to the ninth embodiment, the protection switches 204 and 205 can also be bidirectional switches. In that case, the structure of the bidirectional switches must be the same as that of the protection switches 201a, 201b, and 202c according to the aforementioned second, third, and fourth embodiments. However, when the capacitors 401 and 402 are not charged during normal operation, it is necessary to discharge a current to the load, and hence a turning-off period cannot be provided during normal operation unlike the aforementioned second, third, and fourth embodiments. When the protection switches 204 and 205 are configured as the bidirectional switches, the protection switch 204 is immediately turned off at the time of the short circuit failure of the diode 103 and the switch 101, whereby the discharging current of the capacitor 401 is limited by the resistance 605 such that the failure of the capacitor 401 can be suppressed.

According to this ninth embodiment, a connection order between the capacitor 401 and the parallel circuit of the protection switch 204 and the resistance 605 and a connection order between the capacitor 402 and the parallel circuit of the protection switch 205 and the resistance 606 are not restricted, but these can be connected in any order.

According to the ninth embodiment, a loss is constantly caused by the protection switches, but the magnitude of a current becomes a difference between charging from the direct-current power supply 8 and discharging to the load 9, and hence the current is reduced as compared with the case where the protection switch circuit is placed in another pathway. Thus, the loss is not always disadvantageous. In the case where as the protection switches 204 and 205, switches constructed by connecting diodes in anti-parallel to switching elements such as IGBTs to allow a current to flow and return to the direct-current power supply 8 therethrough are used, during normal operation, no large reverse bias is applied to freewheeling diodes to be connected, or no reverse recovery loss is generated since the freewheeling diodes are connected with the switching elements. Therefore, inexpensive Si-pn diodes that allow a further reduction in conduction loss as compared with SiC-SB diodes are preferably used as the freewheeling diodes to be connected. When it is necessary to reduce a noise at the time of commutation during normal operation, SiC-SB diodes, which are excellent in forward recovery characteristics, may be used as the freewheeling diodes to be connected. When Si-pn diodes and SiC-SB diodes connected in parallel to each other are used as the freewheeling diodes to be connected, a low loss and a low noise can be achieved.

[Effects of Ninth Embodiment]

The effects of the three-level chopper apparatus 900 according to the ninth embodiment are similar to those of the three-level chopper apparatus 700 according to the aforementioned seventh embodiment.

Tenth Embodiment

A three-level chopper apparatus 1000 according to a tenth embodiment is now described with reference to FIG. 10.

Figure 10:
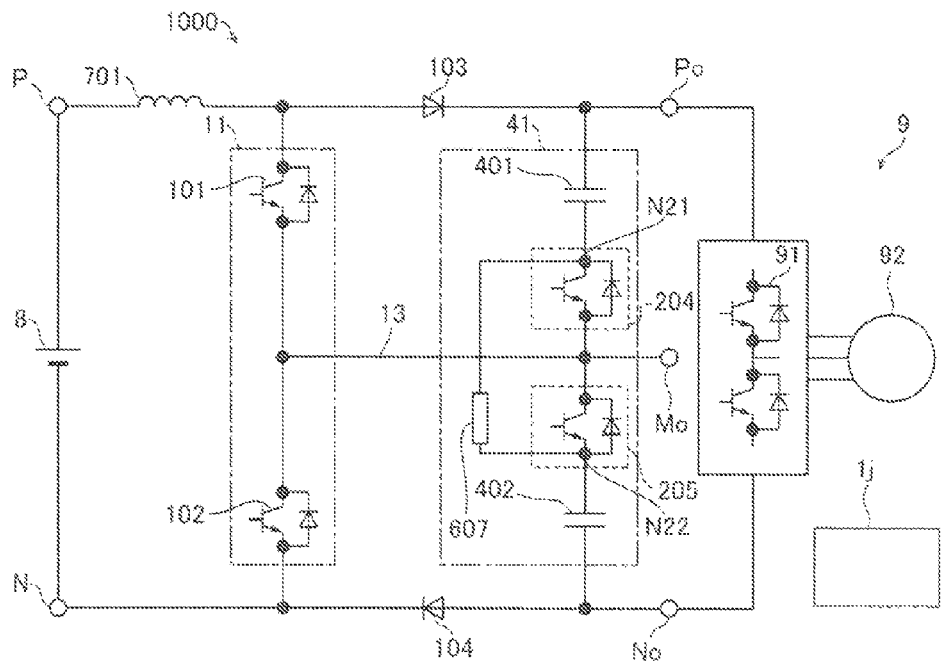
FIG. 10 is a circuit configuration diagram of a three-level chopper apparatus according to a tenth embodiment of the present invention.

According to the tenth embodiment, in the three-level chopper apparatus 1000, instead of the resistances 605 and 606 shown in FIG. 9 according to the aforementioned ninth embodiment, a resistance 607 is connected (in parallel) between a connection point N21 between a capacitor 401 and a protection switch 204 and a connection point N22 between a capacitor 402 and a protection switch 205, as shown in FIG. 10. The three-level chopper apparatus 1000 includes a control circuit 1j. The remaining structures of the three-level chopper apparatus 1000 according to the tenth embodiment are similar to those of the three-level chopper apparatus 900 according to the aforementioned ninth embodiment. The protection switches 204 and 205 according to the tenth embodiment are examples of a "fifth protection switch" and a "sixth protection switch" in the claims, respectively. The resistance 607 is an example of a "third resistance" in the claims.

In this three-level chopper apparatus 1000 according to the tenth embodiment, similarly to another embodiment, control for switching on and off switches 101 and 102 of a switch series circuit 11 is performed in a state where the protection switches 204 and 205 of a capacitor series circuit 41 are turned on and the resistance 607 is short-circuited during normal operation such that a direct-current voltage is converted. The protection switches 204 and 205 are configured such that a current can flow and return to a direct-current power supply 8 therethrough, and hence flow of a current from the capacitors to the side of a load is not prevented.

When the switch 101 has a short circuit failure in the switch series circuit 11 of the three-level chopper apparatus 1000, for example, the switch 102 and the protection switch 205 are immediately turned off such that the resistance 607 is inserted into the charging path of the capacitor 402.

In this state, an LCR series resonant current flows through a pathway from the direct-current power supply 8 through a reactor 701, the switch 101 having a short circuit failure, the protection switch 204 (through which a current can flow and return to the direct-current power supply 8), the resistance 607, the capacitor 402, and a diode 104 to the direct-current power supply 8. The capacitor 402 is charged with this current. Thus, the amount of charges that flows into the capacitor 402 is reduced by the resistance 607, and hence occurrence of an overvoltage on the capacitor 402 can be prevented.

Similarly to the aforementioned fifth embodiment, the resistance value Ra2 of this resistance 607 is set to a value shown by the following formula (14), whereby a resonant circuit on the above pathway can be critically damped or overdamped. Thus, when the switch 101 has a short circuit failure in an operating state where the voltages of the capacitors 401 and 402 are lower than the voltage VE of the direct-current power supply 8, the charging voltage of the capacitor 402 can be kept to the voltage VE of the direct-current power supply 8. Consequently, occurrence of an overvoltage on the capacitor 402 can be suppressed.

$$Ra2 \geq 2 \times (2 \times L/C2)^{1/2} \qquad (14)$$

When the capacity value C of the smaller of the capacity of the capacitor 401 and the capacity of the capacitor 402 is used to allow the resistance value Ra2 of the resistance 607 to satisfy the following formula (15), whereby a formed LCR series resonant circuit can be critically damped or overdamped even when any of the switches 101 and 102 has a short circuit failure.

$$Ra2 \geq 2 \times (2 \times L/C)^{1/2} \qquad (15)$$

When a diode 103 and the switch 101 each have a short circuit failure, the switch 102 and the protection switch 205 are immediately turned off such that the resistance 607 is inserted into the charging path of the capacitor 402. A current flow pathway from the direct-current power supply 8 becomes the pathway from the direct-current power supply 8 through the reactor 701, the switch 101 having a short circuit failure, the protection switch 204 (through which a current can flow and return to the direct-current power supply 8), the resistance 607, the capacitor 402, and the diode 104 to the direct-current power supply 8. This pathway is the same as when only the switch 101 has a failure, and hence an overvoltage on the capacitor 402 can be prevented also in this case. Furthermore, the resistance value Ra2 of the resistance 607 is set to the value shown by the formula (14) or (15), whereby the resonant circuit on the above pathway can be critically damped or overdamped. Thus, when the switch 101 has a short circuit failure in the operating state where the voltages of the capacitors 401 and 402 are lower than the voltage VE of the direct-current power supply 8, the charging voltage of the capacitor 402 can be kept to the voltage VE of the direct-current power supply 8.

[Effects of Tenth Embodiment]

According to the tenth embodiment, the following effects can be obtained.

According to the tenth embodiment, as hereinabove described, the three-level chopper apparatus 1000 includes the protection switch 204 connected in series between the capacitor 401 and a connection path 13, the protection switch 205 connected in series between the capacitor 402 and the connection path 13, and the resistance 607 connected in parallel between the connection point N21 between the capacitor 401 and the protection switch 204 and the connection point N22 between the capacitor 402 and the protection switch 205. Thus, when the switch 101 has a short circuit failure, for example, the control circuit 1j performs control for turning off the switch 102, turning on the protection switch 204, and turning off the protection switch 205, whereby the LCR series resonant circuit is formed in the pathway from the direct-current power supply 8, the reactor 701, the switch 101 having a short circuit failure, the protection switch 204, the resistance 607, the capacitor 402, and the diode 104 to the direct-current power supply 8. Consequently, the amount of charges that flows into the capacitor 402 is reduced such that occurrence of an overvoltage on the capacitor 402 can be more effectively suppressed.

According to the tenth embodiment, as hereinabove described, the resistance Ra2 satisfies the above formula (15) where Ra2 represents the resistance value of the resistance 607, L represents the inductance of the reactor 701, and C represents the smaller of the capacity of the capacitor 401 and the capacity of the capacitor 402. Thus, a current that flows through the LCR series resonant circuit including the resistance 607 having the resistance value Ra2 can be critically damped or overdamped, and hence occurrence of an overvoltage on the capacitor 401 or 402 can be more reliably suppressed when the switch 101 or 102 has a short circuit failure.

The remaining effects of the three-level chopper apparatus 1000 according to the tenth embodiment are similar to those of the three-level chopper apparatus 800 according to the aforementioned eighth embodiment.

Eleventh Embodiment

A three-level chopper apparatus 1100 according to an eleventh embodiment is now described with reference to FIG. 11.

Figure 11:
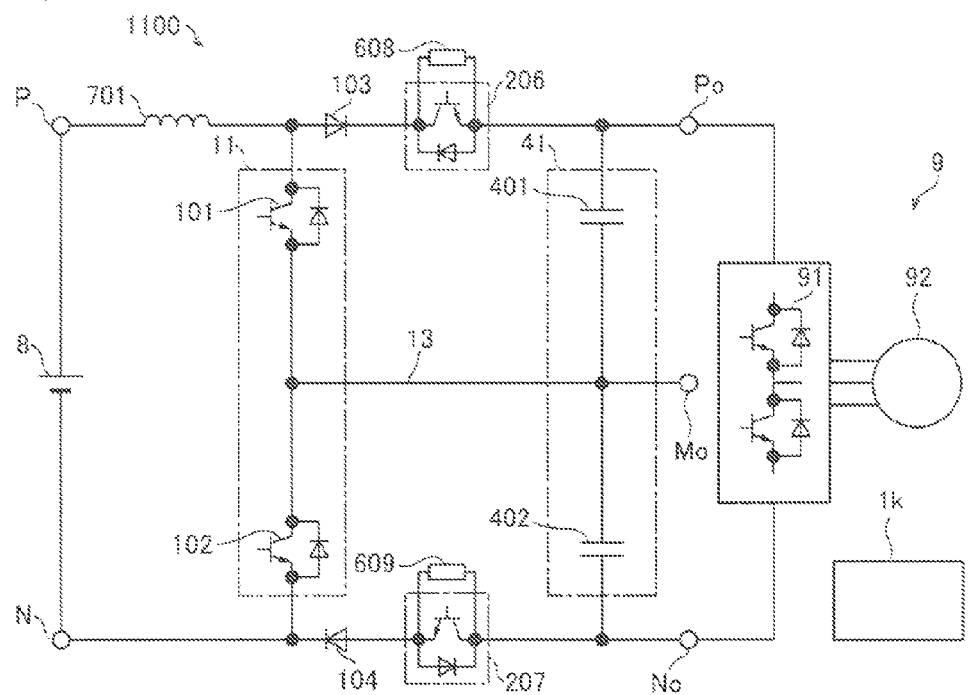
FIG. 11 is a circuit configuration diagram of a three-level chopper apparatus according to an eleventh embodiment of the present invention.

According to the eleventh embodiment, in the three-level chopper apparatus 1100, a parallel circuit of a protection switch 206 and a resistance 608 and a parallel circuit of a protection switch 207 and a resistance 609 are connected in series to diodes 103 and 104, respectively, as shown in FIG. 11. The three-level chopper apparatus 1100 includes a control circuit 1k. The remaining structures of the three-level chopper apparatus 1100 according to the eleventh embodiment are similar to those of the three-level chopper apparatus 700 according to the aforementioned seventh embodiment. When the protection switches 206 and 207 are turned on, it is only required to allow a current to flow in a direction in which the diodes 103 and 104 conduct. The protection switches 206 and 207 are examples of a "fourteenth protection switch" and a "twelfth protection switch" in the claims, respectively. The resistances 608 and 609 are examples of a "sixth resistance" and a "fifth resistance" in the claims, respectively.

In this three-level chopper apparatus 1100 according to the eleventh embodiment, when the diodes 103 and 104 are caused to conduct during normal operation, the protection switches 206 and 207 are turned on, and the resistances 608 and 609 are short-circuited. In other words, similarly to another embodiment, control for switching on and off switches 101 and 102 of a switch series circuit 11 is performed such that a direct-current voltage is converted.

When the switch 101 has a short circuit failure in the switch series circuit 11 of the three-level chopper apparatus 1100, for example, the switch 102 and the protection switch 207 are turned off.

In this state, an LC series resonant current flows through a pathway from a direct-current power supply 8 through a reactor 701, the switch 101 having a short circuit failure, a capacitor 402, the resistance 609, and the diode 104 to the direct-current power supply 8. The capacitor 402 is charged with this current. Thus, the amount of charges that flows into the capacitor 402 is reduced by the resistance 609 such that occurrence of an overvoltage on the capacitor 402 can be prevented.

Similarly to the aforementioned seventh embodiment, the resistance value Rc3 of this resistance 609 is set to a value shown by the following formula (16), whereby a resonant circuit on the above pathway can be critically damped or overdamped. Thus, when the switch 101 has a short circuit failure in an operating state where the voltages of capacitors 401 and 402 are lower than the voltage VE of the direct-current power supply 8, the charging voltage of the capacitor 402 can be kept to the voltage VE of the direct-current power supply 8. Consequently, occurrence of an overvoltage on the capacitor 402 can be suppressed. Similarly, the resistance value Rd3 of the resistance 608 is set to a value shown by the following formula (17), whereby when the switch 102 has a short circuit failure in the operating state where the voltages of the capacitors 401 and 402 are lower than the voltage VE of the direct-current power supply 8, the voltage of the capacitor 401 can be kept to the voltage VE of the direct-current power supply 8.

$$Rc3 \geq 2 \times (2 \times L/C2)^{1/2} \quad (16)$$

$$Rd3 \geq 2 \times (2 \times L/C1)^{1/2} \quad (17)$$

Also when the diode 103 and the switch 101 each have a short circuit failure, the switch 102 and the protection switch 207 are turned off, whereby a current flow pathway from the direct-current power supply 8 becomes the pathway from the direct-current power supply 8 through the reactor 701, the switch 101 having a short circuit failure, the capacitor 402, the resistance 609, and the diode 104 to the direct-current power supply 8. This pathway is the same as when only the switch 101 has a failure, and hence an overvoltage on the capacitor 402 can be prevented also in this case. Furthermore, the resistance value Rc3 of the resistance 609 is set to the value shown by the formula (16), whereby the resonant circuit on the pathway can be critically damped or overdamped, and the voltage of the capacitor 402 can be kept to the voltage VE of the direct-current power supply 8 when the diode 103 and the switch 101 each have a short circuit failure in the operating state where the voltages of the capacitors 401 and 402 are lower than the voltage VE of the direct-current power supply 8.

When the protection switch 206 is a switch that is configured such that a current can flow and return to the direct-current power supply 8 therethrough, the capacitor 401 is not discharged through the resistance 608, and hence an effect of suppressing the failure of the capacitor 401 cannot be obtained. On the other hand, when the protection switches 206 and 207 are constructed by connecting semiconductor switches including reverse blocking IGBTs, diodes and MOSFETs, IGBTs, or the like in series to each other, a current flows through the resistance 608, and hence the failure of the capacitor 401 is suppressed. When the protection switch 206 includes reverse blocking IGBTs, a leakage current is reduced by turning on gates of the reverse blocking IGBTs. When the protection switch 206 includes bidirectional switches, the protection switch 206 is turned off immediately after the failure of the diode 103, whereby the capacitor 401 can also be discharged through the resistance 608.

In the case of the protection switches 206 and 207 that are configured such that a current can flow and return to the direct-current power supply 8 therethrough and are constructed by connecting diodes in anti-parallel to IGBTs or the like, for example, during normal operation, no large reverse bias is applied to the protection switches, or no reverse recovery loss is generated since the diodes do not conduct. Therefore, inexpensive Si-pn diodes are used as the freewheeling diodes, whereby a loss can be reduced. When a noise at the time of commutation during normal operation is reduced, SiC-SB diodes, which are excellent in forward recovery characteristics, may be used as the freewheeling diodes. Furthermore, a low loss and a low noise can be achieved by constructing the freewheeling diodes by connecting Si-pn diodes and SiC-SB didoes in parallel to each other.

In the case where a protection switch 201a is provided in a connection path 13 as in the aforementioned fifth embodiment, for example, two elements including IGBTs, MOSFETs, or diodes are added in a current flow pathway when only one of capacitors 401 and 402 is charged during normal operation, unlike the case where no protection switch circuit is provided. On the other hand, according to this eleventh embodiment, only one switch element is added in a current flow pathway when switches that are configured such that a current can flow and return to the direct-current power supply 8 therethrough or reverse blocking IGBTs are used as the protection switches 206 and 207, and hence a conduction loss can be reduced as compared with the aforementioned second and fourth embodiments in which the protection switches 201a and 202c constructed by connecting the switches in anti-series to each other are provided. Thus, the efficiency of the three-level chopper apparatus 1100 can be increased. In a mode in which both the switches 101 and 102 are turned off, however, a loss is caused by the two protection switches according to the eleventh embodiment whereas no loss is caused by the protection switch circuit according to the aforementioned first to fifth embodiments.

According to this eleventh embodiment, a connection order of the diode 103 and the parallel circuit of the protection switch 206 and the resistance 608 and a connection order of the diode 104 and the parallel circuit of the protection switch 207 and the resistance 609 are not restricted, but these can be connected in any order.

[Effects of Eleventh Embodiment]

The effects of the three-level chopper apparatus 1100 according to the eleventh embodiment are similar to those of the three-level chopper apparatus 700 according to the aforementioned seventh embodiment.

Twelfth Embodiment

A three-level chopper apparatus 1200 according to a twelfth embodiment is now described with reference to FIG. 12.

Figure 12:
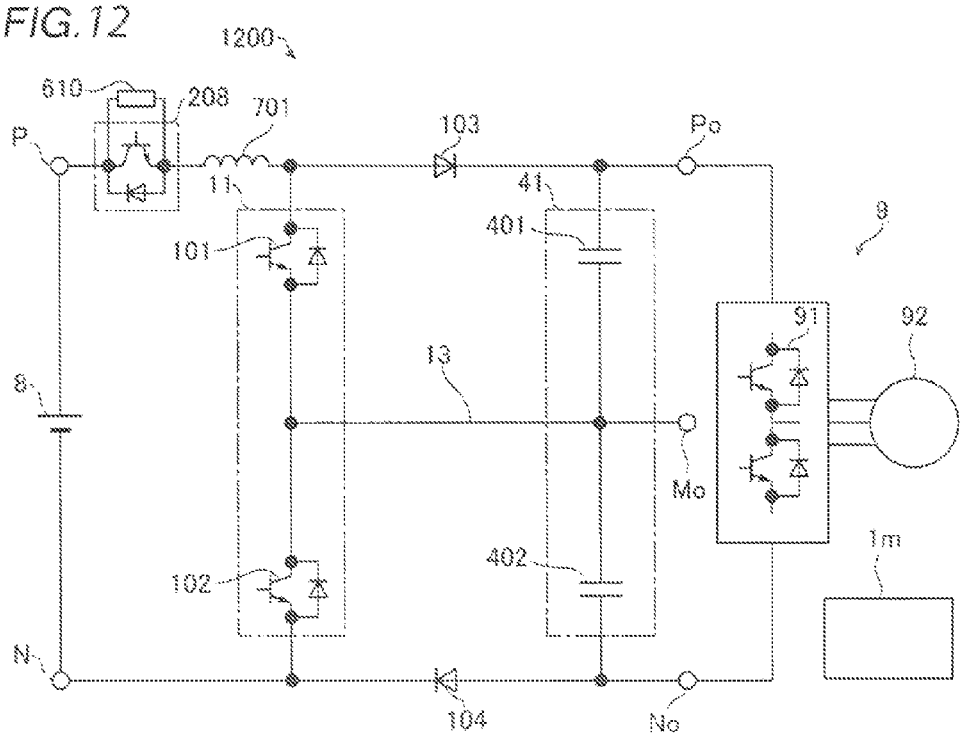
FIG. 12 is a circuit configuration diagram of a three-level chopper apparatus according to a twelfth embodiment of the present invention.

According to the twelfth embodiment, in the three-level chopper apparatus 1200, instead of the protection switches 202 and 203 and the resistances 602 and 603 according to the aforementioned seventh embodiment, a protection switch 208 connected in parallel with a resistance 610 is connected in series to a reactor 701, as shown in FIG. 12. The three-level chopper apparatus 1200 includes a control circuit 1m. The remaining structures of the three-level chopper apparatus 1200 according to the twelfth embodiment are similar to those of the three-level chopper apparatus 700 according to the aforementioned seventh embodiment. The protection switch 208 is an example of a "ninth protection switch" in the claims. The resistance 610 is an example of a "fourth resistance" in the claims.

In the three-level chopper apparatus 1200 according to this twelfth embodiment, similarly to another embodiment, control for switching on and off switches 101 and 102 of a switch series circuit 11 is performed in a state where the protection switch 208 is turned on and the resistance 610 is short-circuited during normal operation such that a direct-current voltage is converted.

When the switch 101 has a short circuit failure in the switch series circuit 11 of the three-level chopper apparatus 1200, for example, the switch 102 and the protection switch 208 are immediately turned off, and the resistance 610 is inserted into the charging path of a capacitor 402.

In this state, an LCR series resonant current flows through a pathway from a direct-current power supply 8 through the resistance 610, the reactor 701, the switch 101 having a short circuit failure, the capacitor 402, and a diode 104 to the direct-current power supply 8. The capacitor 402 is charged with this current. Thus, the amount of charges that flows into the capacitor 402 is reduced by the resistance 610, and hence occurrence of an overvoltage on the capacitor 402 can be suppressed.

Similarly to the aforementioned seventh embodiment, the resistance value Rb of this resistance 610 is set to a value shown by the following formula (18), whereby a resonant circuit on the pathway can be critically damped or overdamped. Thus, when the switch 101 has a short circuit failure in an operating state where the voltages of capacitors 401 and 402 are lower than the voltage VE of the direct-current power supply 8, the charging voltage of the capacitor 402 can be kept to the voltage VE of the direct-current power supply 8. Consequently, occurrence of an overvoltage on the capacitor 402 can be suppressed.

$$Rb \geq 2 \times (2 \times L/C2)^{1/2} \quad (18)$$

When the capacity value C of the smaller of the capacity of the capacitor 401 and the capacity of the capacitor 402 is used to allow the resistance value Rb of the resistance 610 to satisfy the following formula (19), whereby a formed LCR series resonant circuit can be critically damped or overdamped even when any of the switches 101 and 102 has a short circuit failure.

$$Rb \geq 2 \times (2 \times L/C)^{1/2} \quad (19)$$

When a diode 103 and the switch 101 each have a short circuit failure, the switch 102 and the protection switch 208 are immediately turned off such that the resistance 610 is inserted into the charging path of the capacitor 402. A current flow pathway from the direct-current power supply 8 becomes the pathway from the direct-current power supply 8 through the resistance 610, the reactor 701, the switch 101 having a short circuit failure, the capacitor 402, and the diode 104 to the direct-current power supply 8. This pathway is the same as when only the switch 101 has a failure, and hence an overvoltage on the capacitor 402 can be prevented also in this case. Furthermore, the resistance value Rb of this resistance 610 is set to the value shown by the above formula (18) or (19), whereby the resonant circuit on the above pathway can be critically damped or overdamped. Thus, the charging voltage of the capacitor 402 can be kept to the voltage VE of the direct-current power supply 8 when the diode 103 and the switch 101 each have a short circuit failure in the operating state where the voltages of the capacitors 401 and 402 are lower than the voltage VE of the direct-current power supply 8.

A connection order of the protection switch 208, the reactor 701, and the direct-current power supply 8 is not restricted, but these can be connected in any order.

[Effects of Twelfth Embodiment]

According to the twelfth embodiment, the following effects can be obtained.

According to the twelfth embodiment, as hereinabove described, the three-level chopper apparatus 1200 includes the protection switch 208 connected in series to the reactor 701 and the resistance 610 connected in parallel to both ends of the protection switch 208. Thus, when the switch 101 or 102 has a short circuit failure, the control circuit 1m performs control for turning off the protection switch 208, whereby the resistance 610 can be added in the current pathway. Consequently, when the switch 101 or 102 has a short circuit failure, the current pathway can be formed as an LCR series resonant circuit, and hence occurrence of an overvoltage on the capacitor 401 or 402 can be suppressed.

According to the twelfth embodiment, as hereinabove described, the resistance value Rb satisfies the above formula (19) where Rb represents the resistance value of the resistance 610, L represents the inductance of the reactor 701, and C represents the smaller of the capacity of the capacitor 401 and the capacity of the capacitor 402. Thus, a current that flows through the LCR series resonant circuit including the resistance 610 having the resistance value Rb can be critically damped or overdamped, and hence occurrence of an overvoltage on the capacitor 401 or 402 can be more reliably suppressed when the switch 101 or 102 has a short circuit failure.

The remaining effects of the three-level chopper apparatus 1200 according to the twelfth embodiment are similar to those of the three-level chopper apparatus 100 according to the aforementioned first embodiment.

Thirteenth Embodiment

A three-level chopper apparatus 1300 according to a thirteenth embodiment is now described with reference to FIG. 13.

Figure 13:
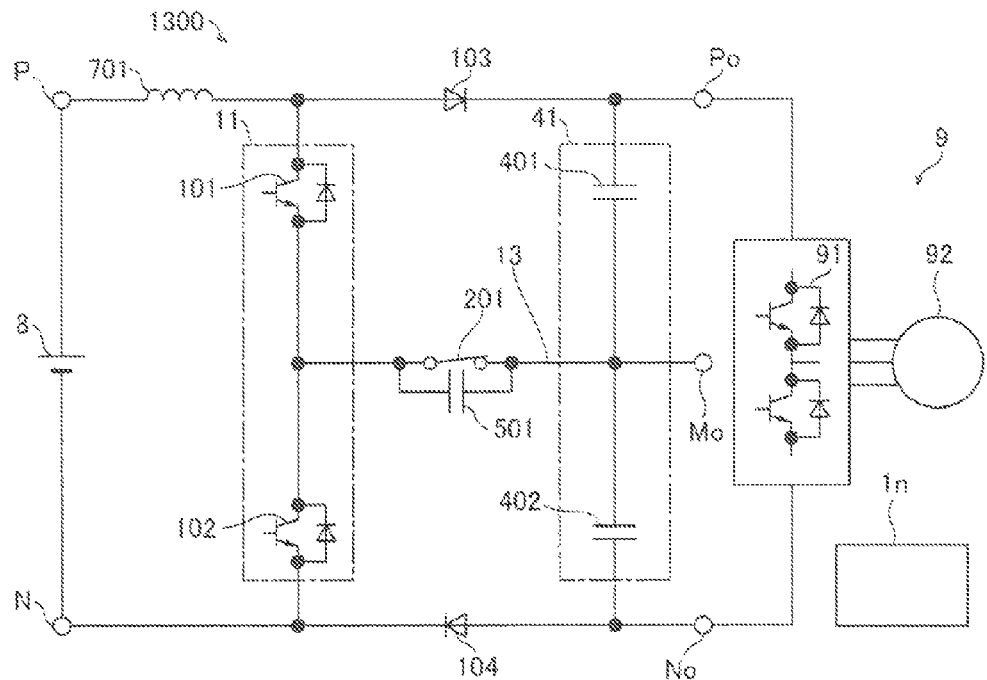
FIG. 13 is a circuit configuration diagram of a three-level chopper apparatus according to a thirteenth embodiment of the present invention.

According to the thirteenth embodiment, in the three-level chopper apparatus 1300, a protection capacitor 501 is connected in parallel to the protection switch 201 inserted into the connection path 13 that connects the intermediate point (connection point N3) of the switch series circuit 11 and the intermediate point (connection point N4) of the capacitor series circuit 41 in the three-level chopper apparatus 100 according to the aforementioned first embodiment, as shown in FIG. 13. The three-level chopper apparatus 1300 includes a control circuit 1n. The remaining structures of the three-level chopper apparatus 1300 according to the thirteenth embodiment are similar to those of the three-level chopper apparatus 100 according to the aforementioned first embodiment. The protection capacitor 501 is an example of a "first protection capacitor" in the claims.

During the normal operation of the three-level chopper apparatus according to this thirteenth embodiment, the protection switch 201 is turned on such that no current flows through the protection capacitor 501.

When a switch 101 has a short circuit failure in the switch series circuit 11 of the three-level chopper apparatus, for example, the protection switch 201 is turned off, and the protection capacitor 501 is inserted into the connection path 13 that connects the intermediate point of the switch series circuit 11 and the intermediate point of the capacitor series circuit 41.

In this state, a capacitor 402 and the protection capacitor 501 are charged through a pathway from a direct-current power supply 8 through a reactor 701, the switch 101 having a short circuit failure, the protection capacitor 501, the capacitor 402, and a diode 104 to the direct-current power supply 8, and capacitors 401 and 402 start to be charged through a pathway from the direct-current power supply 8 through the reactor 701, a diode 103, the capacitor 401, the capacitor 402, and the diode 104 to the direct-current power supply 8 when the voltage of the protection capacitor 501 reaches the voltage of the capacitor 401.

Thus, the sum of the charging voltages of the protection capacitor 501 and the capacitor 402 exceeds the voltage VE of the direct-current power supply 8. However, the protection capacitor 501 and the capacitor 402 share the summed voltage, and hence the voltage to which the capacitor 402 is charged is reduced as compared with the case where the protection switch 201 does not disconnect the connection path 13, and occurrence of an overvoltage on the capacitor 402 can be suppressed.

When the diode 103 and the switch 101 each have a short circuit failure, the protection switch 201 is turned off.

In this state, an LC series resonant current flows through a pathway from the direct-current power supply 8 through the reactor 701, the switch 101 having a short circuit failure, the protection capacitor 501, the capacitor 402, and the diode 104 to the direct-current power supply 8 and a pathway from the direct-current power supply 8 through the reactor 701, the diode 103 having a short circuit failure, the capacitor 401, the capacitor 402, and the diode 104 to the direct-current power supply 8. In this case, the diode 103 has a short circuit failure, and hence the capacitors 401 and 402 and the protection capacitor 501 are charged through any one of the above pathways after short-circuit discharging of the capacitor 401 or flow of a current to the protection capacitor 501. Also in this case, the voltage to which the capacitor 402 is charged is reduced as compared with the case where the protection switch 201 does not disconnect the connection path 13, and occurrence of an overvoltage on the capacitor 402 can be suppressed.

[Effects of Thirteenth Embodiment]

According to the thirteenth embodiment, the following effects can be obtained.

According to the thirteenth embodiment, as hereinabove described, the three-level chopper apparatus 1300 includes the protection capacitor 501 connected in parallel to the protection switch 201. Thus, when the switch 101 has a shirt circuit failure and control for turning off the protection switch 201 is performed, for example, an LC series resonant current flows through the pathway from the direct-current power supply 8 through the reactor 701, the switch 101 having a short circuit failure, the protection capacitor 501, the capacitor 402, and the diode 104 to the direct-current power supply 8. In this case, the protection capacitor 501 and the capacitor 402 are charged through this pathway while sharing charges, and hence occurrence of an overvoltage on the capacitor 402 can be suppressed as compared with the case where only the capacitor 402 is charged.

The remaining effects of the three-level chopper apparatus 1300 according to the thirteenth embodiment are similar to those of the three-level chopper apparatus 100 according to the aforementioned first embodiment.

Fourteenth Embodiment

A three-level chopper apparatus 1400 according to a fourteenth embodiment is now described with reference to FIG. 14.

Figure 14:
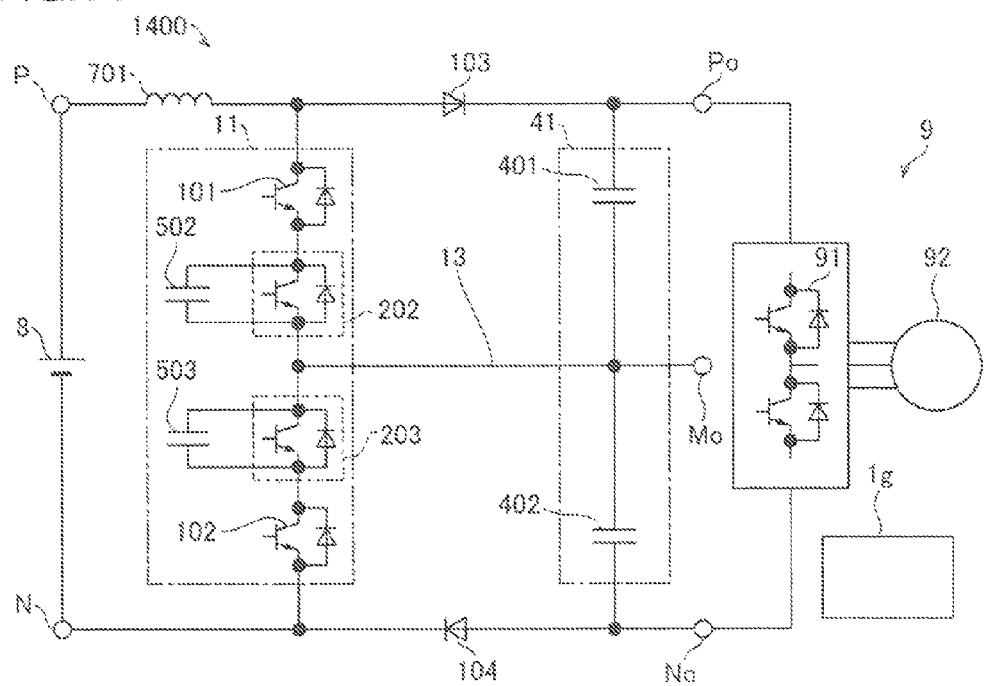
FIG. 14 is a circuit configuration diagram of a three-level chopper apparatus according to a fourteenth embodiment of the present invention.

According to the fourteenth embodiment, in the three-level chopper apparatus 1400, protection capacitors 502 and 503 are connected in parallel to the protection switches 202 and 203 connected in series to the switches 101 and 102, which perform control for turning on and off the switch series circuit 11 according to the aforementioned sixth embodiment, as shown in FIG. 14. The remaining structures of the three-level chopper apparatus 1400 according to the fourteenth embodiment are similar to those of the three-level chopper apparatus 600 according to the aforementioned sixth embodiment. The protection switches 202 and 203 according to the fourteenth embodiment are examples of a "thirteenth protection switch" and a "sixteenth protection switch" in the claims, respectively. The protection capacitors 502 and 503 are examples of a "fifth protection capacitor" and a "sixth protection capacitor" in the claims, respectively.

The operation of the protection switches 202 and 203 in this three-level chopper apparatus 1400 according to the fourteenth embodiment is the same as that of the three-level chopper apparatus 600 according to the sixth embodiment. During normal operation, the protection switches 202 and 203 are turned on, and the protection capacitors 502 and 503 are short-circuited such that no current flows through the protection capacitors 502 and 503.

When the switch 101 has a short circuit failure, the switch 102 and the protection switch 202 are turned off.

In this state, an LC series resonant current flows through a pathway from a direct-current power supply 8 through a reactor 701, the switch 101 having a short circuit failure, the protection capacitor 502, a capacitor 402, and a diode 104 to the direct-current power supply 8, and the capacitor 402 and the protection capacitor 502 are charged. When the voltage of the protection capacitor 502 reaches the voltage of a capacitor 401, an LC series resonant current flows through a pathway from the direct-current power supply 8 through the reactor 701, a diode 103, the capacitor 401, the capacitor 402, and the diode 104 to the direct-current power supply 8, and the capacitors 401 and 402 start to be charged through this pathway.

Thus, the sum of the charging voltages of the protection capacitor 502 and the capacitor 402 exceeds the voltage VE of the direct-current power supply 8. However, the protection capacitor 502 and the capacitor 402 share the summed voltage, and hence the voltage to which the capacitor 402 is charged is reduced as compared with the case where no protection switch circuit is provided, and occurrence of an overvoltage on the capacitor 402 can be suppressed.

Also when the diode 103 and the switch 101 each have a short circuit failure, the switch 102 and the protection switch 202 are turned off, whereby occurrence of an overvoltage on the capacitor 402 can be suppressed similarly to the thirteenth embodiment.

Also according to this fourteenth embodiment, a connection order of the switches 101 and 102 and the protection switches 202 and 203 is not restricted, but these can be connected in any order.

[Effects of Fourteenth Embodiment]

According to the fourteenth embodiment, the following effects can be obtained.

According to the fourteenth embodiment, as hereinabove described, the three-level chopper apparatus 1400 includes the protection switches 202 and 203 and the protection capacitors 502 and 503 connected in parallel to the protection switches 202 and 203. Thus, when the switch 101 has a short circuit failure, the protection switch 202 is turned off, whereby the protection capacitor 502 and the capacitor 402 are charged through the current pathway while sharing charges. When the switch 102 has a short circuit failure, the protection switch 203 is turned off, whereby the protection capacitor 503 and the capacitor 401 are charged through the current pathway while sharing charges. Therefore, occurrence of an overvoltage on the capacitor 401 or 402 can be suppressed as compared with the case where only the capacitor 401 or 402 is charged.

The remaining effects of the three-level chopper apparatus 1400 according to the fourteenth embodiment are similar to those of the three-level chopper apparatus 100 according to the aforementioned first embodiment.

Fifteenth Embodiment

A three-level chopper apparatus 1500 according to a fifteenth embodiment is now described with reference to FIG. 15.

Figure 15:
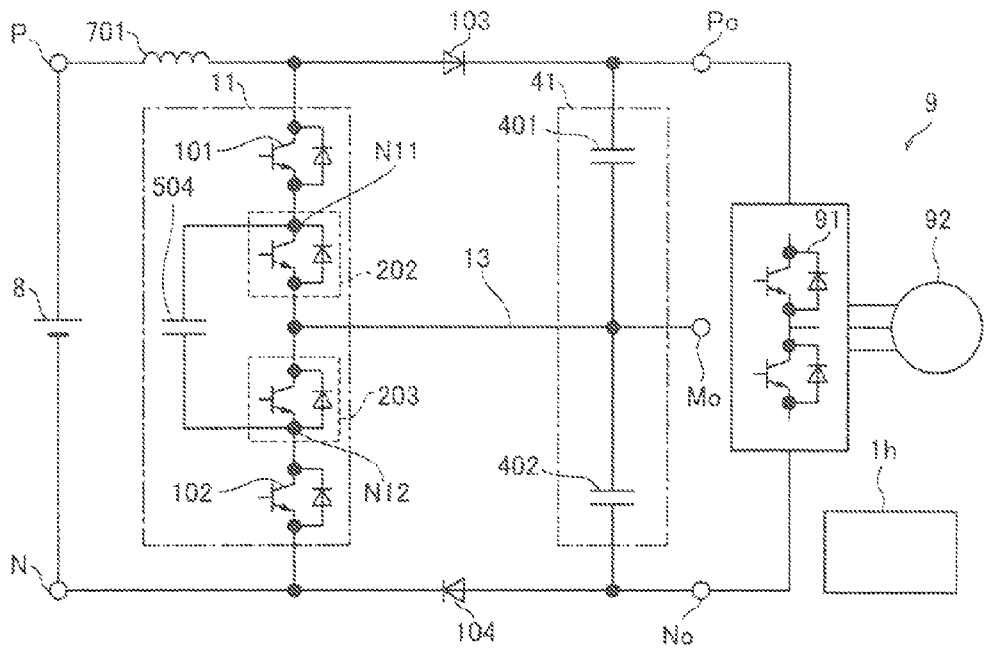
FIG. 15 is a circuit configuration diagram of a three-level chopper apparatus according to a fifteenth embodiment of the present invention.

According to the fifteenth embodiment, in the three-level chopper apparatus 1500, a protection capacitor 504 is connected in parallel between a connection point N11 between a switch 101 and a protection switch 202 and a connection point N12 between a switch 102 and a protection switch 203, as shown in FIG. 15. The remaining structures of the three-level chopper apparatus 1500 according to the fifteenth embodiment are similar to those of the three-level chopper apparatus 700 according to the aforementioned seventh embodiment. The protection switches 202 and 203 according to the fifteenth embodiment are examples of a "third protection switch" and a "fourth protection switch" in the claims, respectively. The protection capacitor 504 is an example of a "second protection capacitor" in the claims.

The protection switches 202 and 203 according to this fifteenth embodiment operate similarly to those according to the aforementioned seventh embodiment. More specifically, during the normal operation of the three-level chopper apparatus, both the protection switches 202 and 203 are turned on, and the protection capacitor 504 is short-circuited such that no current flows through the protection capacitor 504.

When the switch 101 has a short circuit failure in a switch series circuit 11 of the three-level chopper apparatus 1500, for example, the switch 102 and the protection switch 202 are immediately turned off.

In this state, an LC series resonant current flows through a pathway from a direct-current power supply 8 through a reactor 701, the switch 101 having a short circuit failure, the protection capacitor 504, the protection switch 203 (through which a current can flow and return to the direct-current power supply 8), a capacitor 402, and a diode 104 to the direct-current power supply 8, and the capacitor 402 and the protection capacitor 504 are charged. When the voltage of the protection capacitor 504 reaches the voltage of a capacitor 401, the capacitors 401 and 402 start to be charged through a pathway from the direct-current power supply 8, the reactor 701, a diode 103, the capacitor 401, the capacitor 402, and the diode 104 to the direct-current power supply 8.

Thus, when the sum of the charging voltages of the protection capacitor 504 and the capacitor 402 exceeds the voltage VE of the direct-current power supply 8. However, the protection capacitor 504 and the capacitor 402 share the summed voltage, and hence the voltage to which the capacitor 402 is charged is reduced as compared with the case where no protection switch circuit is provided, and occurrence of an overvoltage on the capacitor 402 is suppressed.

Also when the diode 103 and the switch 101 each have a short circuit failure, occurrence of an overvoltage on the capacitor 402 is suppressed by the protection capacitor 504 similarly to the aforementioned thirteenth embodiment.

[Effects of Fifteenth Embodiment]

According to the fifteenth embodiment, the following effects can be obtained.

According to the fifteenth embodiment, as hereinabove described, the protection capacitor 504 connected in parallel between the connection points N11 and N12 is provided in the three-level chopper apparatus 1500. Thus, when the switch 101 has a short circuit failure and a control circuit 1h performs control for turning off the protection switch 202 and turning on the protection switch 203, for example, an LC series resonant current flows through the pathway from the direct-current power supply 8 through the reactor 701, the switch 101 having a short circuit failure, the protection capacitor 504, the protection switch 203, the capacitor 402, and the diode 104 to the direct-current power supply 8. In this case, the protection capacitor 504 and the capacitor 402 are charged through this pathway while sharing charges, and hence occurrence of an overvoltage on the capacitor 402 can be more reliably suppressed as compared with the case where only the capacitor 402 is charged.

The remaining effects of the three-level chopper apparatus 1500 according to the fifteenth embodiment are similar to those of the three-level chopper apparatus 700 according to the aforementioned seventh embodiment.

Sixteenth Embodiment

Figure 16:
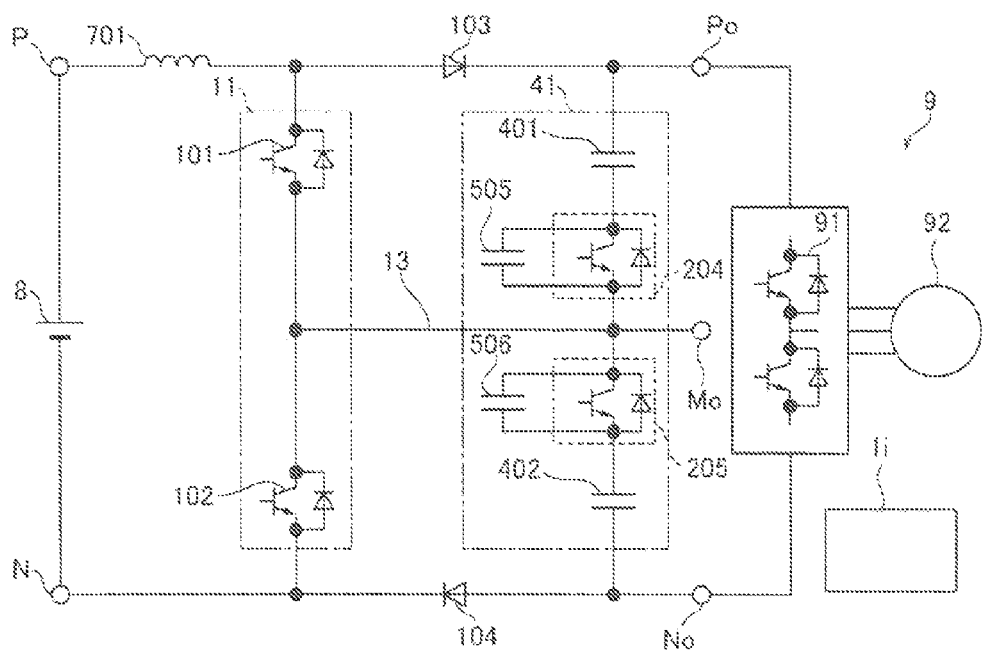
FIG. 16 is a circuit configuration diagram of a three-level chopper apparatus according to a sixteenth embodiment of the present invention.

A three-level chopper apparatus 1600 according to a sixteenth embodiment is now described with reference to FIG. 16.

According to the sixteenth embodiment, the three-level chopper apparatus 1600 includes a parallel circuit of a protection switch 204 and a protection capacitor 505 and a parallel circuit of a protection switch 205 and a protection capacitor 506 in a capacitor series circuit 41. The remaining structures of the three-level chopper apparatus 1600 according to the sixteenth embodiment are similar to those of the three-level chopper apparatus 900 according to the aforementioned ninth embodiment. The protection switches 204 and 205 are examples of a "sixteenth protection switch" and a "thirteenth protection switch" in the claims, respectively. The protection capacitors 505 and 506 are examples of a "sixth protection capacitor" and a "fifth protection capacitor" in the claims, respectively.

In the three-level chopper apparatus 1600 according to this sixteenth embodiment, similarly to another embodiment, control for switching on and off switches 101 and 102 of a switch series circuit 11 is performed in a state where the protection switches 204 and 205 of the capacitor series circuit 41 are turned on and the protection capacitors 505 and 506 are short-circuited during normal operation such that a direct-current voltage is converted. The protection switches 204 and 205 are configured such that a current can flow and return to a direct-current power supply 8 therethrough, and hence flow of a current from capacitors to the side of a load is not prevented.

When the switch 101 has a short circuit failure in the switch series circuit 11 of the three-level chopper apparatus 1600, for example, the switch 102 and the protection switch 205 are immediately turned off, and the protection capacitor 506 is inserted into the charging path of a capacitor 402.

In this state, an LC series resonant current flows through a pathway from the direct-current power supply 8 through a reactor 701, the switch 101 having a short circuit failure, the protection capacitor 506, the capacitor 402, and a diode 104 to the direct-current power supply 8. The protection capacitor 506 and the capacitor 402 are charged with this current.

Thus, when the sum of the charging voltages of the protection capacitor 506 and the capacitor 402 exceeds the voltage VE of the direct-current power supply 8. However, the protection capacitor 506 and the capacitor 402 share the summed voltage, and hence the voltage to which the capacitor 402 is charged is reduced as compared with the case where no protection switch circuit is provided, and occurrence of an overvoltage on the capacitor 402 is suppressed.

When a diode 103 and the switch 101 each have a short circuit failure, the switch 102 and the protection switch 205 are immediately turned off such that the protection capacitor 506 is inserted into the charging path of the capacitor 402. A current flow pathway from the direct-current power supply 8 becomes the pathway from the direct-current power supply 8 through the reactor 701, the switch 101 having a short circuit failure, the protection capacitor 506, the capacitor 402, and the diode 104 to the direct-current power supply 8. This pathway is the same as when only the switch 101 has a failure, and hence an overvoltage on the capacitor 402 can be suppressed also in this case.

The protection switches 204 and 205 can also be bidirectional switches. In that case, the structure of the bidirectional switches and control for turning on and off the bidirectional switches must be the same as when the protection switches 204 and 205 are the bidirectional switches in the aforementioned eighth embodiment.

According to this sixteenth embodiment, a connection order between the capacitor 401 and the parallel circuit of the protection switch 204 and the protection capacitor 505 and a connection order between the capacitor 402 and the parallel circuit of the protection switch 205 and the protection capacitor 506 are not restricted, but these can be connected in any order.

[Effects of Sixteenth Embodiment]

The effects of the three-level chopper apparatus 1600 according to the sixteenth embodiment are similar to those of the three-level chopper apparatus 1400 according to the aforementioned fourteenth embodiment.

Seventeenth Embodiment

A three-level chopper apparatus 1700 according to a seventeenth embodiment is now described with reference to FIG. 17.

Figure 17:
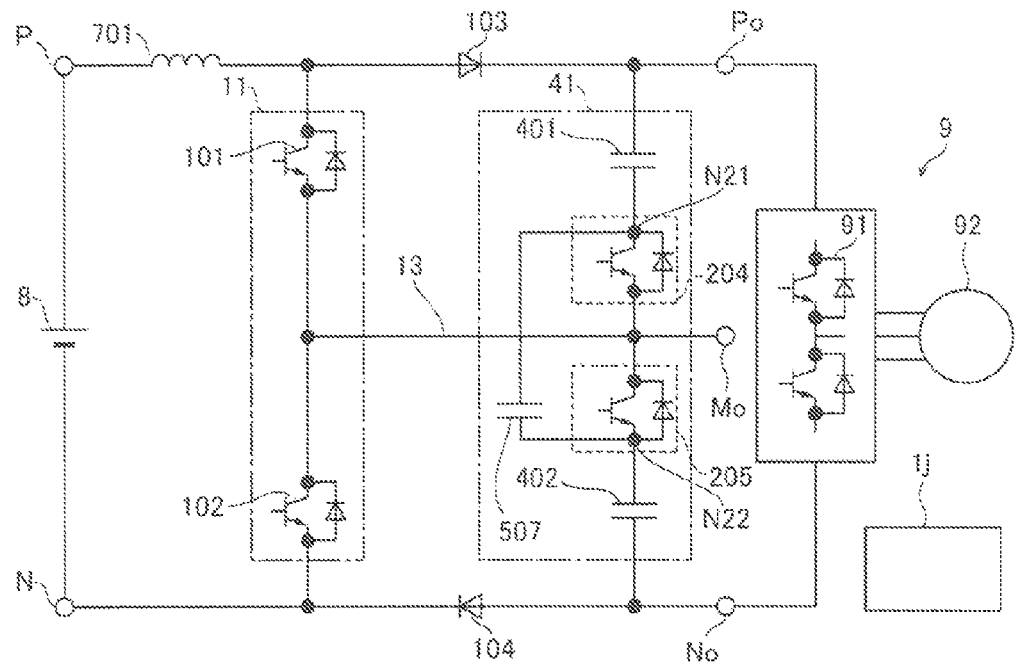
FIG. 17 is a circuit configuration diagram of a three-level chopper apparatus according to a seventeenth embodiment of the present invention.

According to the seventeenth embodiment, in the three-level chopper apparatus 1700, instead of the resistance 607 according to the aforementioned tenth embodiment, a protection capacitor 507 is connected, as shown in FIG. 17. The remaining structures of the three-level chopper apparatus 1700 according to the seventeenth embodiment are similar to those of the three-level chopper apparatus 1000 according to the aforementioned tenth embodiment. Protection switches 204 and 205 according to the seventeenth embodiment are examples of a "seventh protection switch" and an "eighth protection switch" in the claims, respectively. The protection capacitor 507 is an example of a "third protection capacitor" in the claims.

In the three-level chopper apparatus 1700 according to this seventeenth embodiment, the structures of and control for the protection switches 204 and 205 are similar to those in the three-level chopper apparatus 1000 according to the tenth embodiment. More specifically, similarly to another embodiment, control for switching on and off switches 101 and 102 of a switch series circuit 11 is performed in a state where the protection switches 204 and 205 of a capacitor series circuit 41 are turned on and the protection capacitor 507 is short-circuited during normal operation such that a direct-current voltage is converted. The protection switches 204 and 205 are configured such that a current can flow and return to a direct-current power supply 8 therethrough, and hence flow of a current from capacitors to the side of a load is not prevented.

When the switch 101 has a short circuit failure in the switch series circuit 11 of the three-level chopper apparatus 1700, for example, the switch 102 and the protection switch 205 are immediately turned off, and the protection capacitor 507 is inserted into the charging path of a capacitor 402.

In this state, an LC series resonant current flows through a pathway from the direct-current power supply 8 through a reactor 701, the switch 101 having a short circuit failure, the protection switch 204 (through which a current can flow and return to the direct-current power supply 8), the protection capacitor 507, the capacitor 402, and a diode 104 to the direct-current power supply 8. The protection capacitor 507 and the capacitor 402 are charged with this current.

Thus, when the sum of the charging voltages of the protection capacitor 507 and the capacitor 402 exceeds the voltage VE of the direct-current power supply 8. However, the protection capacitor 507 and the capacitor 402 share the summed voltage, and hence the voltage to which the capacitor 402 is charged is reduced as compared with the case where no protection switch circuit is provided, and occurrence of an overvoltage on the capacitor 402 is suppressed.

When a diode 103 and the switch 101 each have a short circuit failure, the switch 102 and the protection switch 205 are immediately turned off such that the protection capacitor 507 is inserted into the charging path of the capacitor 402. A current flow pathway from the direct-current power supply 8 becomes the pathway from the direct-current power supply 8 through the reactor 701, the switch 101 having a short circuit failure, the protection capacitor 507, the capacitor 402, and the diode 104 to the direct-current power supply 8. This pathway is the same as when only the switch 101 has a failure, and hence an overvoltage on the capacitor 402 can be prevented also in this case.

[Effects of Seventeenth Embodiment]

According to the seventeenth embodiment, the following effects can be obtained.

According to the seventeenth embodiment, as hereinabove described, the three-level chopper apparatus 1700 includes the protection switch 204 connected in series between a capacitor 401 and a connection path 13, the protection switch 205 connected in series between the capacitor 402 and the connection path 13, and the protection capacitor 507 connected in parallel between a connection point N21 between the capacitor 401 and the protection switch 204 and a connection point N22 between the protection switch 205 and the capacitor 402. Thus, when the switch 101 has a short circuit failure and control for turning off the switch 102, turning on the protection switch 204, and turning off the protection switch 205 is performed, for example, an LC series resonant current flows through the pathway from the direct-current power supply 8 through the reactor 701, the switch 101 having a short circuit failure, the protection switch 204, the protection capacitor 507, the capacitor 402, and the diode 104 to the direct-current power supply 8. In this case, the protection capacitor 507 and the capacitor 402 are charged through this pathway while sharing charges, and hence occurrence of an overvoltage on the capacitor 402 can be suppressed as compared with the case where only the capacitor 402 is charged.

The remaining effects of the three-level chopper apparatus 1700 according to the seventeenth embodiment are similar to those of the three-level chopper apparatus 100 according to the aforementioned first embodiment.

Eighteenth Embodiment

A three-level chopper apparatus 1800 according to an eighteenth embodiment is now described with reference to FIG. 18.

Figure 18:
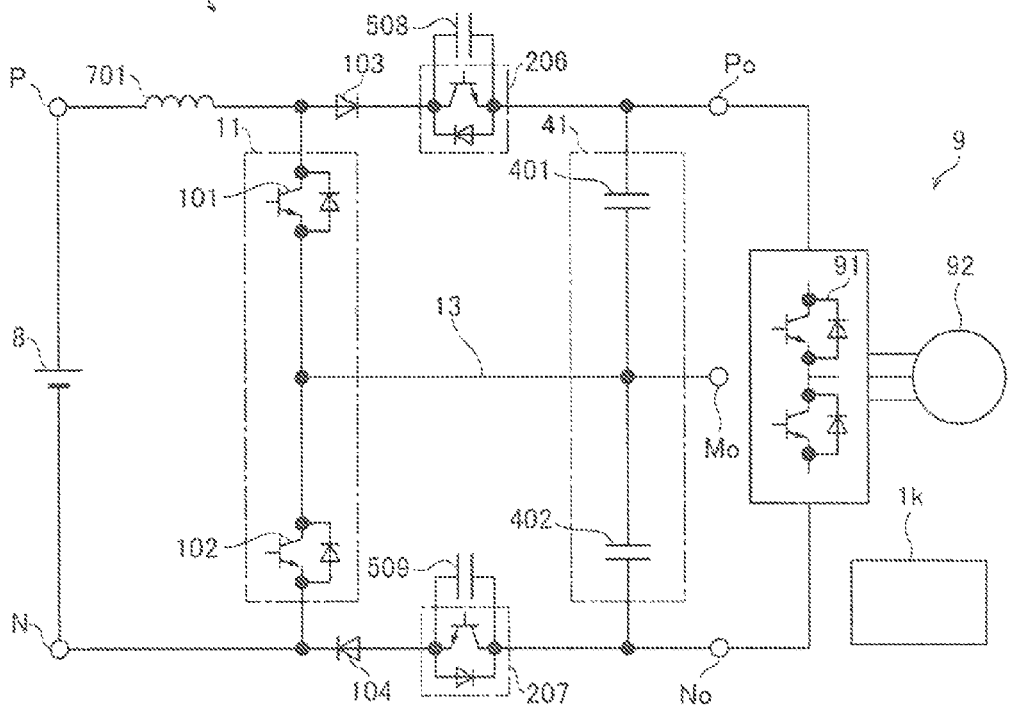
FIG. 18 is a circuit configuration diagram of a three-level chopper apparatus according to an eighteenth embodiment of the present invention.

According to the eighteenth embodiment, in the three-level chopper apparatus 1800, a parallel circuit of a protection switch 206 and a protection capacitor 508 and a parallel circuit of a protection switch 207 and a protection capacitor 509 are connected in series to didoes 104 and 104, respectively, as shown in FIG. 18. The remaining structures of the three-level chopper apparatus 1800 according to the eighteenth embodiment are similar to those of the three-level chopper apparatus 1100 according to the aforementioned eleventh embodiment.

The protection switches 206 and 207 according to the eighteenth embodiment are examples of a "sixteenth protection switch" and a "thirteenth protection capacitor" in the claims, respectively. The protection capacitors 508 and 509 are examples of a "sixth protection capacitor" and a "fifth protection capacitor" in the claims, respectively.

In the three-level chopper apparatus 1800 according to this eighteenth embodiment, when the diodes 103 and 104 are caused to conduct during normal operation, the protection switches 206 and 207 are turned on, and the protection capacitors 508 and 509 are short-circuited. More specifically, similarly to another embodiment, control for switching on and off switches 101 and 102 of a switch series circuit 11 is performed such that a direct-current voltage is converted.

When the switch 101 has a short circuit failure in the switch series circuit 11 of the three-level chopper apparatus 1800, for example, the switch 102 and the protection switch 207 are turned off, and the protection capacitor 509 is inserted into the charging path of a capacitor 402.

In this state, an LC series resonant current flows through a pathway from a direct-current power supply 8 through a reactor 701, the switch 101 having a short circuit failure, the capacitor 402, the protection capacitor 509, and the diode 104 to the direct-current power supply 8. The protection capacitor 509 and the capacitor 402 are charged with this current.

Thus, when the sum of the charging voltages of the protection capacitor 509 and the capacitor 402 exceeds the voltage VE of the direct-current power supply 8. However, the protection capacitor 509 and the capacitor 402 share the summed voltage, and hence the voltage to which the capacitor 402 is charged is reduced as compared with the case where no protection switch circuit is provided, and occurrence of an overvoltage on the capacitor 402 is suppressed.

When the diode 103 and the switch 101 each have a short circuit failure, the switch 102 and the protection switch 207 are immediately turned off such that the protection capacitor 509 is inserted into the charging path of the capacitor 402. A current flow pathway from the direct-current power supply 8 becomes the pathway from the direct-current power supply 8 through the reactor 701, the switch 101 having a short circuit failure, the capacitor 402, the protection capacitor 509, and the diode 104 to the direct-current power supply 8. This pathway is the same as when only the switch 101 has a failure, and hence an overvoltage on the capacitor 402 can be prevented also in this case.

According to this eighteenth embodiment, a connection order of the diode 103 and the parallel circuit of the protection switch 206 and the protection capacitor 508 and a connection order of the diode 104 and the parallel circuit of the protection switch 207 and the protection capacitor 509 are not restricted, but these can be connected in any order.

[Effects of Eighteenth Embodiment]

The effects of the three-level chopper apparatus 1800 according to the eighteenth embodiment are similar to those of the three-level chopper apparatus 1400 according to the aforementioned fourteenth embodiment.

Nineteenth Embodiment

A three-level chopper apparatus 1900 according to a nineteenth embodiment is now described with reference to FIG. 19.

Figure 19:
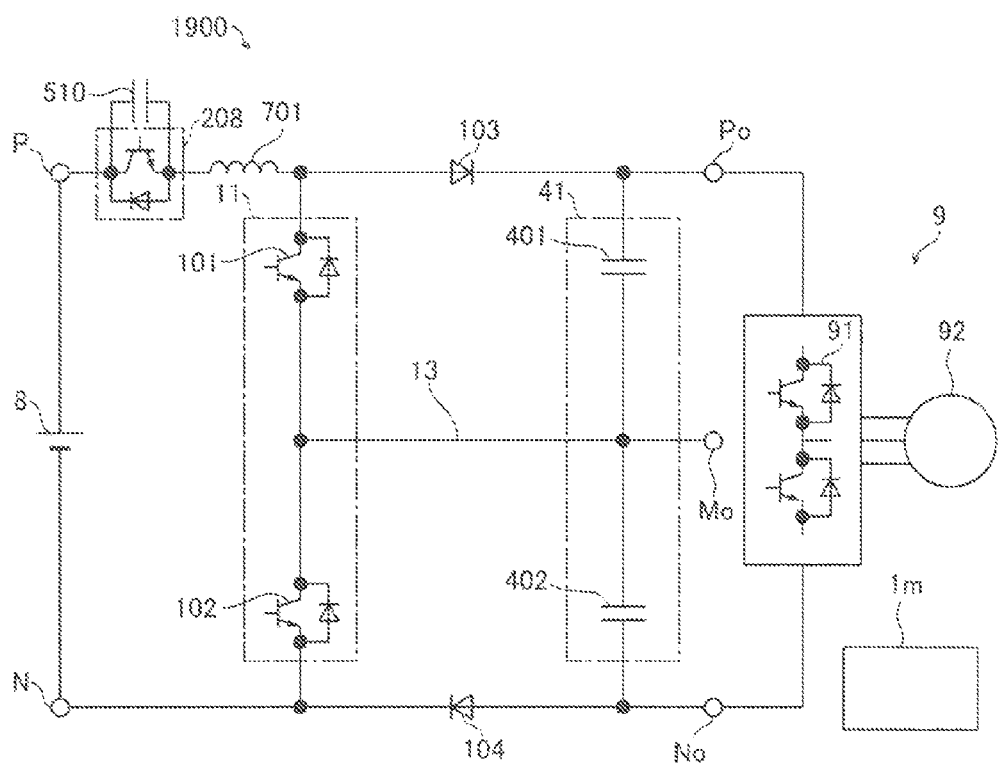
FIG. 19 is a circuit configuration diagram of a three-level chopper apparatus according to a nineteenth embodiment of the present invention.

According to the nineteenth embodiment, in the three-level chopper apparatus 1900, instead of the resistance 610 according to the aforementioned twelfth embodiment, a protection capacitor 510 is connected, as shown in FIG. 19. The remaining structures of the three-level chopper apparatus 1900 according to the nineteenth embodiment are similar to those of the three-level chopper apparatus 1200 according to the aforementioned twelfth embodiment. A protection switch 208 according to the nineteenth embodiment is an example of a "tenth protection switch" in the claims. The protection capacitor 510 is an example of a "fourth protection capacitor" in the claims.

In the three-level chopper apparatus 1900 according to this nineteenth embodiment, similarly to another embodiment, control for switching on and off switches 101 and 102 of a switch series circuit 11 is performed in a state where the protection switch 208 is turned on and the protection capacitor 510 is short-circuited during normal operation such that a direct-current voltage is converted.

When the switch 101 has a short circuit failure in the switch series circuit 11 of the three-level chopper apparatus 1900, for example, the switch 102 and the protection switch 208 are immediately turned off, and the protection capacitor 510 is inserted into the charging path of a capacitor 402.

In this state, an LC series resonant current flows through a pathway from a direct-current power supply 8 through the protection capacitor 510, a reactor 701, the switch 101 having a short circuit failure, the capacitor 402, and a diode 104 to the direct-current power supply 8. The protection capacitor 510 and the capacitor 402 are charged with this current.

Thus, when the sum of the charging voltages of the protection capacitor 510 and the capacitor 402 exceeds the voltage VE of the direct-current power supply 8. However, the protection capacitor 510 and the capacitor 402 share the summed voltage, and hence the voltage to which the capacitor 402 is charged is reduced as compared with the case where no protection switch circuit is provided, and occurrence of an overvoltage on the capacitor 402 is suppressed.

When a diode 103 and the switch 101 each have a short circuit failure, the switch 102 and the protection switch 208 are immediately turned off such that the protection capacitor 510 is inserted into the charging path of the capacitor 402. A current flow pathway from the direct-current power supply 8 becomes the pathway from the direct-current power supply 8 through the protection capacitor 510, the reactor 701, the switch 101 having a short circuit failure, the capacitor 402, and the diode 104 to the direct-current power supply 8. This pathway is the same as when only the switch 101 has a failure, and hence an overvoltage on the capacitor 402 can be suppressed also in this case.

A connection order of the protection switch 208, the reactor 701, and the direct-current power supply 8 is not restricted, but these can be connected in any order.

[Effects of Nineteenth Embodiment]

According to the nineteenth embodiment, the following effects can be obtained.

According to the nineteenth embodiment, as hereinabove described, the three-level chopper apparatus 1900 includes the protection switch 208 connected in series to the reactor 701 and the protection capacitor 510 connected in parallel to both ends of the protection switch 208. Thus, when the switch 101 or 102 has a short circuit failure, control for turning off the protection switch 208 is performed, whereby the protection capacitor 510 can be added in the current pathway. In this case, the protection capacitor 510 and one of capacitors 401 and 402 are charged through this pathway while sharing charges, and hence occurrence of an overvoltage on the capacitor 401 or 402 can be suppressed as compared with the case where only the capacitor 401 or 402 is charged.

The remaining effects of the three-level chopper apparatus 1900 according to the nineteenth embodiment are similar to those of the three-level chopper apparatus 100 according to the aforementioned first embodiment.

[Modification]

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while an element other than the protection switch, the resistance, and the protection capacitor is not provided in the connection path in each of the aforementioned first to nineteenth embodiments, the present invention is not restricted to this. According to the present invention, an element other than the protection switch, the resistance, and the protection capacitor may alternatively be provided in the connection path so far as the protection switches can be controlled to be turned on and off such that one of the capacitors, the resistance, or the protection capacitor is inserted into the pathway through which an overvoltage is applied to the other of the capacitors at the time of failure.

Figure 20:
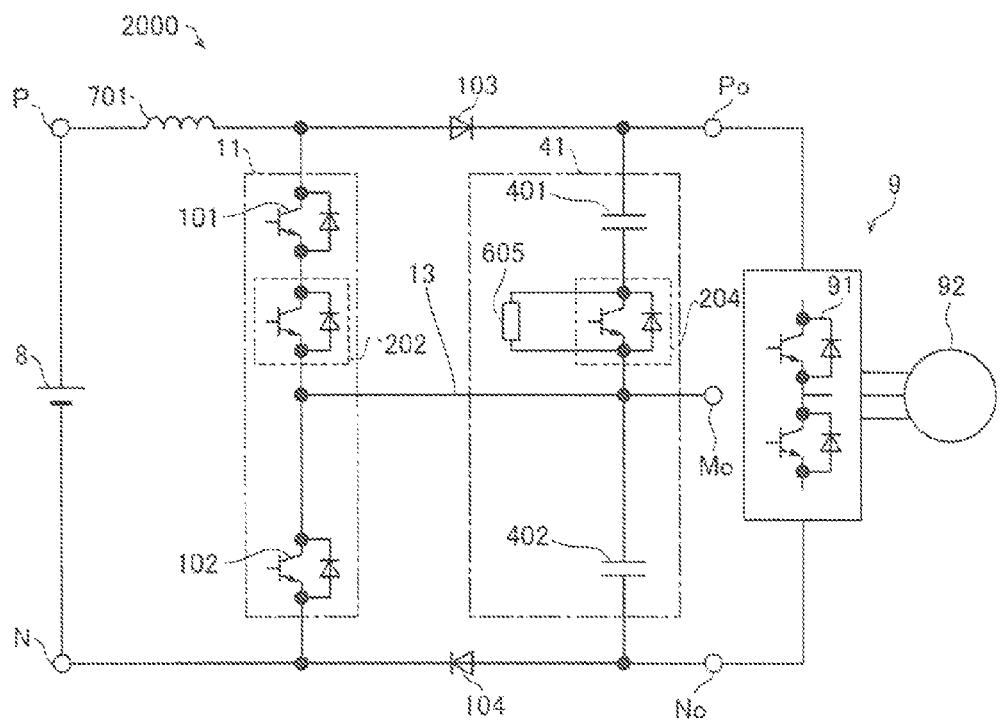
FIG. 20 is an example of the circuit configuration of a three-level chopper apparatus according to an embodiment obtained by combining the sixth embodiment and the ninth embodiment of the present invention.

For example, the protection switch circuit may alternatively be configured by properly combining the aforementioned sixth, seventh, ninth, eleventh, fourteenth, sixteenth, and eighteenth embodiments. Also in a three-level chopper apparatus 2000 shown in FIG. 20, in which the sixth embodiment and the ninth embodiment are combined in a three-level chopper apparatus, when a switch 101 has a short circuit failure, a protection switch 202 is turned off such that a capacitor 401 is inserted into a pathway through which a capacitor 402 is charged, and hence an overvoltage on the capacitor 402 is suppressed.

Furthermore, a protection switch 204 is turned off, whereby a resistance 605 is added in a resonant current flow pathway such that the current is reduced, and the attained voltage of the capacitor 402 is further reduced. On the other hand, when a switch 102 has a short circuit failure, the protection switch 204 is turned off, whereby a current with which the capacitor 401 is charged is damped by the resistance 605, and an overvoltage on the capacitor 402 can be suppressed.

What is claimed is:

1. A three-level chopper apparatus comprising:
    a direct-current power supply;
    a first switch and a second switch;
    a first diode and a second diode;
    a first capacitor and a second capacitor;
    a reactor;
    a connection path; and
    a protection switch circuit, wherein
    the first diode, the first capacitor, the second capacitor, the second diode, the second switch, and the first switch are connected in series to each other in this order in a loop,
    the direct-current power supply is connected in parallel between a connection point between the first diode and the first switch and a connection point between the second switch and the second diode through the reactor,
    the connection path connects a connection point between the first switch and the second switch and a connection point between the first capacitor and the second capacitor, and
    the protection switch circuit is controllable to change a current pathway through which an overvoltage is applied to the second capacitor or the first capacitor to a current pathway through which no overvoltage is applied to the second capacitor or the first capacitor when the first switch or the second switch has a failure.

2. The three-level chopper apparatus according to claim 1, wherein
    the protection switch circuit is a bidirectional protection switch connected in series to the connection path.

3. The three-level chopper apparatus according to claim 2, wherein
    a diode of the bidirectional protection switch includes a silicon diode.

4. The three-level chopper apparatus according to claim 2, wherein
    a diode of the bidirectional protection switch includes a silicon carbide diode.

5. The three-level chopper apparatus according to claim 2, wherein
    a diode of the bidirectional protection switch includes a diode in which a silicon diode and a silicon carbide diode are connected in parallel to each other.

6. The three-level chopper apparatus according to claim 2, wherein
    the protection switch circuit includes a first resistance connected in parallel to the bidirectional protection switch.

7. The three-level chopper apparatus according to claim 2, wherein
    the protection switch circuit includes a first protection capacitor connected in parallel to the bidirectional protection switch.

8. The three-level chopper apparatus according to claim 1, wherein
    the protection switch circuit includes:
    a first protection switch connected in series between the first switch and the connection path,
    a second protection switch connected in series between the second switch and the connection path, and
    a second resistance connected in parallel between a connection point between the first switch and the first protection switch and a connection point between the second protection switch and the second switch.

9. The three-level chopper apparatus according to claim 1, wherein
    the protection switch circuit includes:
    a third protection switch connected in series between the first switch and the connection path,
    a fourth protection switch connected in series between the second switch and the connection path, and
    a second protection capacitor connected in parallel between a connection point between the first switch and the third protection switch and a connection point between the fourth protection switch and the second switch.

10. The three-level chopper apparatus according to claim 1, wherein
    the protection switch circuit includes:
    a fifth protection switch connected in series between the first capacitor and the connection path, a sixth protection switch connected in series between the second capacitor and the connection path, and a third resistance connected in parallel between a connection point between the first capacitor and the fifth protection switch and a connection point between the sixth protection switch and the second capacitor.

11. The three-level chopper apparatus according to claim 10, wherein a resistance value Ra satisfies a following formula (1): $Ra \geq 2 \times (2 \times L/C)^{1/2}$ where Ra represents a resistance value of the third resistance, L represents an inductance of the reactor, and C represents the smaller of a capacity of the first capacitor and a capacity of the second capacitor.

12. The three-level chopper apparatus according to claim 1, wherein the protection switch circuit includes:

a seventh protection switch connected in series between the first capacitor and the connection path, an eighth protection switch connected in series between the second capacitor and the connection path, and a third protection capacitor connected in parallel between a connection point between the first capacitor and the seventh protection switch and a connection point between the eighth protection switch and the second capacitor.

13. The three-level chopper apparatus according to claim 1, wherein the protection switch circuit includes:

a ninth protection switch connected in series to the reactor, and a fourth resistance connected in parallel to both ends of the ninth protection switch.

14. The three-level chopper apparatus according to claim 13, wherein a resistance value Rb satisfies a following formula (2): $Rb \geq 2 \times (2 \times L/C)^{1/2}$ where Rb represents a resistance value of the fourth resistance, L represents an inductance of the reactor, and C represents the smaller of a capacity of the first capacitor and a capacity of the second capacitor.

15. The three-level chopper apparatus according to claim 1, wherein the protection switch circuit includes:

a tenth protection switch connected in series to the reactor, and a fourth protection capacitor connected in parallel to both ends of the tenth protection switch.

16. The three-level chopper apparatus according to claim 1, wherein the protection switch circuit includes both:

a first protection switch partial circuit connected in series to the first switch, the second capacitor, the first diode, or the connection path, and a second protection switch partial circuit connected in series to the second switch, the first capacitor, the second diode, or the connection path.

17. The three-level chopper apparatus according to claim 16, wherein the first protection switch partial circuit includes an eleventh protection switch, and is connected in series to the first switch, the first diode, or the connection path.

18. The three-level chopper apparatus according to claim 16, wherein the first protection switch partial circuit includes:

a twelfth protection switch, and a fifth resistance connected in parallel to the twelfth protection switch.

19. The three-level chopper apparatus according to claim 18, wherein the first protection switch partial circuit is connected in series to the second capacitor, and a resistance value Rc satisfies a following formula (3): $Rc \geq 2 \times (2 \times L/C2)^{1/2}$ where Rc represents a resistance value of the fifth resistance, L represents an inductance of the reactor, and C2 represents a capacity of the second capacitor.

20. The three-level chopper apparatus according to claim 16, wherein the first protection switch partial circuit includes:

a thirteenth protection switch, and a fifth protection capacitor connected in parallel to the thirteenth protection switch.

21. The three-level chopper apparatus according to claim 16, wherein the second protection switch partial circuit includes a fourteenth protection switch, and is connected in series to the second switch, the second diode, or the connection path.

22. The three-level chopper apparatus according to claim 16, wherein the second protection switch partial circuit includes:

a fifteenth protection switch, and a sixth resistance connected in parallel to the fifteenth protection switch.

23. The three-level chopper apparatus according to claim 22, wherein the second protection switch partial circuit is connected in series to the first capacitor, and a resistance value Rd satisfies a following formula (4): $Rd \geq 2 \times (2 \times L/C1)^{1/2}$ where Rd represents a resistance value of the sixth resistance, L represents an inductance of the reactor, and C1 represents a capacity of the first capacitor.

24. The three-level chopper apparatus according to claim 16, wherein the second protection switch partial circuit includes:

a sixteenth protection switch, and a sixth protection capacitor connected in parallel to the sixteenth protection switch.

* * * * *